(12) United States Patent
Tsukagoshi

(10) Patent No.: US 10,778,995 B2
(45) Date of Patent: Sep. 15, 2020

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 237 days.

(21) Appl. No.: 15/746,497

(22) PCT Filed: Aug. 30, 2016

(86) PCT No.: PCT/JP2016/075284
§ 371 (c)(1),
(2) Date: Jan. 22, 2018

(87) PCT Pub. No.: WO2017/038800
PCT Pub. Date: Mar. 9, 2017

(65) Prior Publication Data
US 2018/0213242 A1    Jul. 26, 2018

(30) Foreign Application Priority Data

Sep. 1, 2015    (JP) ................................ 2015-172407

(51) Int. Cl.
*H04N 19/31* (2014.01)
*H04N 19/587* (2014.01)
(Continued)

(52) U.S. Cl.
CPC ............. *H04N 19/31* (2014.11); *H04N 19/10* (2014.11); *H04N 19/46* (2014.11);
(Continued)

(58) Field of Classification Search
CPC ........ H04N 19/10; H04N 19/31; H04N 19/46; H04N 19/587; H04N 19/70; H04N 19/85
See application file for complete search history.

(56) References Cited

U.S. PATENT DOCUMENTS

2004/0036800 A1\*    2/2004    Ohki ..................... H04N 19/30
                                                  348/459
2008/0303941 A1    12/2008    Ohki
(Continued)

FOREIGN PATENT DOCUMENTS

JP    2004-88244 A    3/2004
JP    2006-333071 A    12/2006
(Continued)

OTHER PUBLICATIONS

International Search Report dated Dec. 6, 2016 in PCT/JP2016/075284 filed Aug. 30, 2016.

*Primary Examiner* — Mohammed S Rahaman
(74) *Attorney, Agent, or Firm* — Oblon, McClelland, Maier & Neustadt, L.L.P.

(57) ABSTRACT

A normal frame rate of image data and a high frame rate of image data are favorably transported.
A base stream including, as an access unit, encoded image data per picture in a base frame rate of image data acquired by performing blending processing in units of temporally successive two pictures in the high frame rate of image data, is acquired and additionally an enhanced stream including, as an access unit, encoded image data per picture in the high frame rate of image data, is acquired. A container in a predetermined format is transmitted, the container including the base stream and the enhanced stream.

20 Claims, 23 Drawing Sheets

(51) Int. Cl.
*H04N 19/46* (2014.01)
*H04N 19/70* (2014.01)
*H04N 19/85* (2014.01)
*H04N 19/10* (2014.01)

(52) U.S. Cl.
CPC ........... *H04N 19/587* (2014.11); *H04N 19/70* (2014.11); *H04N 19/85* (2014.11)

(56) References Cited

U.S. PATENT DOCUMENTS

| | | | |
|---|---|---|---|
| 2009/0180761 A1* | 7/2009 | Wand | H04N 5/772 386/329 |
| 2013/0308049 A1 | 11/2013 | Ohki | |
| 2014/0104492 A1* | 4/2014 | Liu | H04N 19/30 348/387.1 |
| 2014/0286415 A1* | 9/2014 | Kang | H04N 19/597 375/240.12 |
| 2015/0092832 A1* | 4/2015 | Xu | H04N 21/44004 375/240.02 |
| 2016/0234500 A1 | 8/2016 | Tsukagoshi | |

FOREIGN PATENT DOCUMENTS

| | | | | |
|---|---|---|---|---|
| JP | 2007-28034 A | 2/2007 | | |
| WO | 2015/076277 A1 | 5/2015 | | |
| WO | WO 2015/076277 A1 * | 5/2015 | ............. | H04N 19/30 |

* cited by examiner

FIG. 4
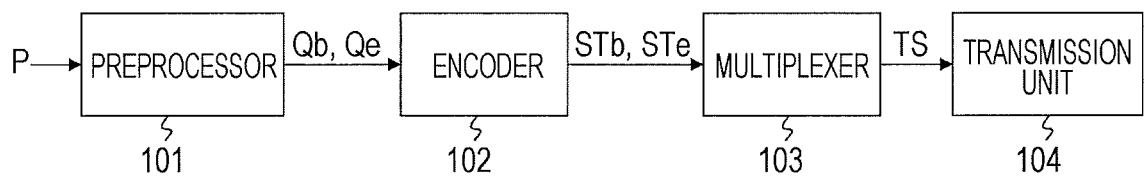
FIG. 5
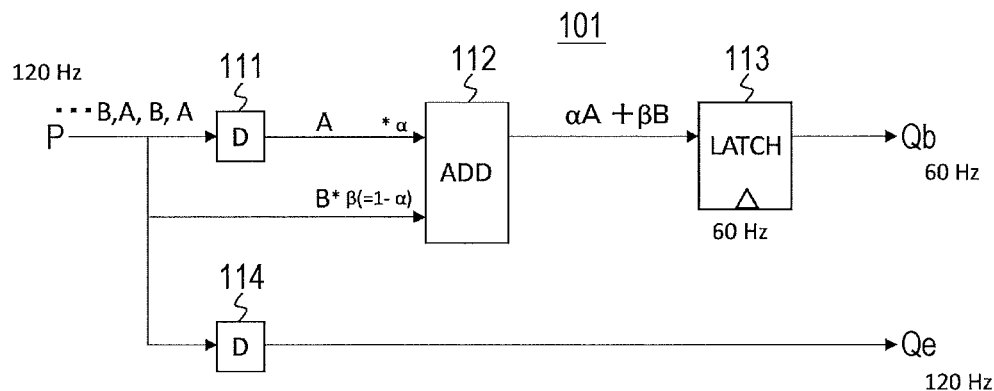
FIG. 6
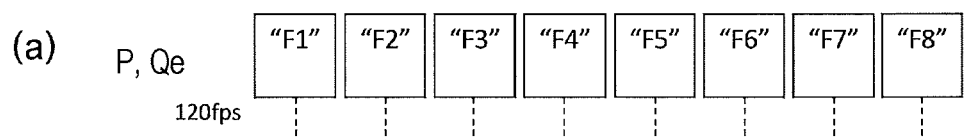
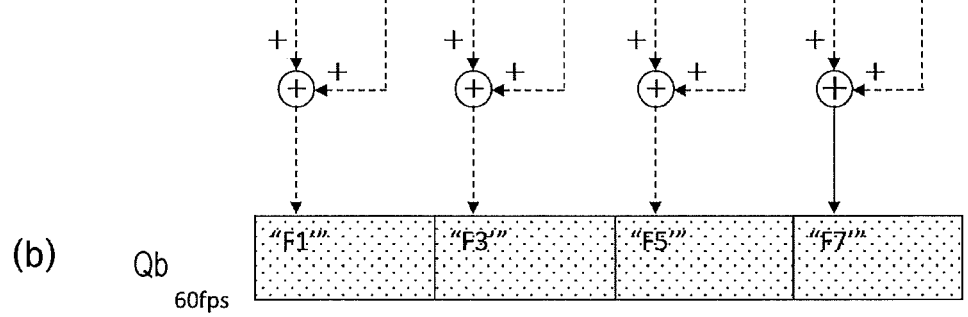

FIG. 8 EXEMPLARY LAYER CONFIGURATIONS AND EXEMPLARY PREDICTIONS

FIG. 13

$1/\alpha = 2$
$(-1) * (\beta/\alpha) = -1$

Blended (n)th

| 42 | 60 | 42 | 24 |
|----|----|----|----|
| 24 | 42 | 60 | 24 |
| 24 | 60 | 42 | 24 |
| 42 | 24 | 24 | 24 |

2 *

− 1 *

(n+1)th

| 60 | 60 | 24 | 24 |
|----|----|----|----|
| 24 | 60 | 60 | 24 |
| 24 | 60 | 24 | 24 |
| 60 | 24 | 24 | 24 |

=

Output ( = (n)th )

| 24 | 60 | 60 | 24 |
|----|----|----|----|
| 24 | 24 | 60 | 24 |
| 24 | 60 | 60 | 24 |
| 24 | 60 | 24 | 24 |

FIG. 16

$1/\alpha = 3/2$
$(-1) * (\beta/\alpha) = -1/2$

Blended (n) th

| 36 | 60 | 48 | 24 |
| 24 | 36 | 60 | 48 | 24 |
| 24 | 36 | 60 | 48 | 24 |
| 36 | 60 | 48 | 24 |

$(3/2) *$     $- (1/2) *$ (n+1) th

| 60 | 24 | 24 | 24 |
| 24 | 60 | 60 | 24 | 24 |
| 24 | 60 | 60 | 24 | 24 |
| 60 | 24 | 24 | 24 |

$=$

Output ( = (n) th )

| 24 | 24 | 24 | 24 |
| 24 | 60 | 60 | 24 |
| 24 | 60 | 60 | 24 |
| 24 | 24 | 24 | 24 |

| Syntax | No. of Bits | Format |
|---|---|---|
| inverse_blending_layer_prediction_SEI ( ) { | | |
| inverse_blending_layer_prediction_id | 16 | uimsbf |
| inverse_blending_layer_prediction_length | 8 | uimsbf |
| blend_coef_alpha | 4 | uimsbf |
| blend_coef_beta | 4 | uimsbf |
| picture_phase | 1 | bslbf |
| reserved | 7 | 0x7f |
| } | | |

(b)
```
blend_coef_alpha (8bits)   COEFFICIENT α INDICATED.
            0x0              reserved
            0x1              0.2
            0x2              0.25
            0x3              0.33
            0x4              0.5
            0x5              0.67
            0x6              0.75
            0x7              0.8
            0x8              1
blend_coef_beta (8bits)   COEFFICIENT β INDICATED.
            0x0              (1 - Blend_coef_alpha )
            0x1              0.2
            0x2              0.25
            0x3              0.33
            0x4              0.5
            0x5              0.67
            0x6              0.75
            0x7              0.8
            0x8              1
picture_phase             PICTURE PHASE INDICATED
            1                odd
            0                even
```

| Syntax | No. of Bits |
|---|---|
| pic_parameter_set_rbsp( ) { | |
| <OMITTED> | |
|    pps_extension_present_flag | u(1) |
|    if( pps_extension_present_flag ) { | |
|       pps_range_extensions_flag | u(1) |
|       pps_multilayer_extension_flag | u(1) |
|       pps_3d_extension_flag | u(1) |
|       pps_blend_info_extention_flag | U(1) |
|       pps_extension_4bits | U(4) |
| <OMITTED> | |
|       if(pps_blend_info_extention_flag) | |
|          pps_blend_info_extention( ) | |
|       if( pps_extension_4bits ) | |
|          while( more_rbsp_data( ) ) | |
|             pps_extension_data_flag | u(1) |
|    rbsp_trailing_bits( ) | |
| } | |

(b) pps_blend_info_extention_flag (1bit)  FLAG INDICATING WHETHER BLENDING RATIO INFORMATION AND PHASE INFORMATION ARE PRESENT IN EXTENDED PORTION
   '1' PRESENCE (read pps_blend_info_extention( ))
   '0' ABSENCE (c)

| Syntax | No. of Bits |
|---|---|
| pps_blend_info_extention( ) { | |
|    blend_coef_alpha | 4 |
|    blend_coef_beta | 4 |
|    picture_phase | 1 |
|    reserved | 7 |
| } | |

| Syntax | No. of Bits | Format |
|---|---|---|
| video_scalability_information_descriptor() { | | |
|   video_scalability_information_descriptor_tag | 8 | uimsbf |
|   video_scalability_information_descriptor_length | 8 | uimsbf |
|   temporal_scalable_flag | 1 | bslbf |
|   picture_blending_for_base_stream_flag | 1 | bslbf |
|   reserved | 6 | 0x0 |
|   if ( picture_blending_for_base_stream_flag ){ | | |
|     blend_coef_alpha | 4 | uimsbf |
|     blend_coef_beta | 4 | uimsbf |
|     picture_phase | 1 | bslbf |
|     reserved | 7 | 0x7f |
|   } | | |
| } | | |

(b)

temporal_scalable_flag (1bit)   WHETHER STREAM IS TIME SCALABLE, INDICATED.
    '1'     TIME SCALABLE
    '0'     NOT TIME SCALABLE picture_blending_for_base_stream_flag (1bit)   WHETHER PICTURE BLENDING PROCESSING HAS BEEN PERFORMED TO BASE STREAM, INDICATED.
    '1'     BLENDING PROCESSING PERFORMED
    '0'     NO BLENDING PROCESSING PERFORMED

TRANSMISSION DEVICE, TRANSMISSION METHOD, RECEPTION DEVICE, AND RECEPTION METHOD

TECHNICAL FIELD

The present technology relates to a transmission device, a transmission method, a reception device, and a reception method, and more specifically, relates to, for example, a transmission device that transmits a high frame rate of moving image data.

BACKGROUND ART

Recently, a camera that performs high-frame-rate shooting with a high-speed frame shutter, has been known. For example, a normal frame rate is, for example, 60 fps or 50 fps, whereas a high frame rate is a frame rate several times, tens of times, or furthermore, hundreds of times as high as the normal frame rate.

In a case where a high frame rate of service is performed, it is considered that moving image data camera-shot by a high-speed frame shutter is converted into a moving image sequence having a frequency lower than that of the moving image data, so as to be transmitted. However, images by the high-speed frame shutter have effect on improvement of motion blur and achievement of image quality having high sharpness, but have a factor of causing a problem in image quality to the conventional frame interpolation technology on the reception and reproduction side.

Frame interpolation using the images having high sharpness, shot by the high-speed frame shutter, increases the difference between a case where motion vector searching adapts and a case where the motion vector searching does not adapt. Therefore, the difference between the two, is displayed as conspicuous image quality degradation. High load computing is required in order to the precision of the motion vector searching in the frame interpolation, but has influence on receiver costs.

The present applicant has previously proposed the technology of converting the material of images shot by a high-speed frame shutter, to cause a conventional receiver that performs a normal frame rate of decoding, to display with image quality at a certain level or more (refer to Patent Document 1).

CITATION LIST

Patent Document

Patent Document 1: WO 2015/076277

SUMMARY OF THE INVENTION

Problems to be Solved by the Invention

An object of the present technology is to favorably transport a normal frame rate of image data and a high frame rate of image data.

Solutions to Problems

According to a concept of the present technology, a transmission device includes:

an image encoding unit configured to acquire a base stream including, as an access unit, encoded image data per picture in a base frame rate of image data acquired by performing blending processing in units of temporally successive two pictures in a high frame rate of image data, the image encoding unit being configured to acquire an enhanced stream including, as an access unit, encoded image data per picture in the high frame rate of image data; and a transmission unit configured to transmit a container in a predetermined format, the container including the base stream and the enhanced stream.

According to the present technology, the image encoding unit acquires the base stream and the enhanced stream. The base stream is acquired by performing encoding processing to the base frame rate of image data acquired by the performance of the blending processing in the units of temporally successive two pictures in the high frame rate of image data. The enhanced stream is acquired by performing encoding processing to the high frame rate of image data. The transmission unit transmits the container in the predetermined format, the container including the base stream and the enhanced stream.

According to the present technology in this manner, the base stream including the base frame rate of image data acquired by the performance of the blending processing in the units of temporally successive two pictures in the high frame rate of image data, is transmitted. Therefore, a receiver having a decode capability processable to the base frame rate of image data, processes the base stream so as to acquire the base frame rate of image data, so that smooth images can be displayed as a moving image and additionally frame interpolation processing by low load computing in display processing can avoid causing a problem in image quality.

In addition, according to the present technology, the enhanced stream including the high frame rate of image data is transmitted. Therefore, a receiver having a decode capability processable to the high frame rate of image data, processes the enhanced stream so as to acquire the high frame rate of image data, so that image display in the high frame rate can be favorably performed.

Note that, according to the present technology, for example, the image encoding unit may perform prediction encoding processing for the base frame rate of image data, to the base frame rate of image data, so as to acquire the base stream. Additionally, the image encoding unit may perform, with high frame rate of image data, processing inverse to the blending processing, to the base frame rate of image data, so as to acquire image data as after-blend-compensation image data, the image data including, when the high frame rate of image data includes image data of one-side pictures in the units of temporally successive two pictures, image data of the other-side pictures. Then, the image encoding unit may perform prediction encoding processing with the after-blend-compensation image data, to the high frame rate of image data, so as to acquire the enhanced stream. In this case, since the after-blend-compensation image data is made as reference image data in prediction encoding of the high frame rate of image data, a predicted residual can be reduced.

In this case, for example, the image encoding unit may acquire, per predicted block in the high frame rate of image data, image data over a range of more than the predicted block, as the after-blend-compensation image data. With this arrangement, even in a case where the after-blend-compensation image data is made as the reference image data, motion compensation can be favorably performed.

In addition, according to the present technology, for example, an information inserting unit may be further provided, the information inserting unit configured to insert blending ratio information in the blending processing, into a layer of the enhanced stream. In this case, for example, the base stream and the enhanced stream may each have a NAL unit structure, and the information inserting unit may insert a SEI NAL unit having the blending ratio information, into the enhanced stream or may insert the blending ratio information into a PPS NAL unit of the enhanced stream. Inserting the blending ratio information into the layer of the enhanced stream in this manner, can easily and appropriately perform the processing inverse to the blending processing, with the blending ratio information, for example, on the reception side.

In addition, according to the present technology, for example, an information inserting unit may be further provided, the information inserting unit configured to insert, into each access unit of the enhanced stream, phase information indicating to which of the temporally successive two pictures the access unit corresponds. Inserting the phase information into each access unit of the enhanced stream in this manner, can easily and appropriately perform the processing inverse to the blending processing, with the phase information, for example, on the reception side.

In addition, according to the present technology, for example, an information inserting unit may be further provided, the information inserting unit configured to insert, into a layer of the container, identification information indicating that the image data included in the base stream includes the image data acquired by the performance of the blending processing. In this case, on the reception side, it can be easily recognized that the image data included in the base stream includes the image data acquired by the performance of the blending processing, from the identification information.

In addition, according to a different concept of the present technology, a reception device includes:

a reception unit configured to receive a container in a predetermined format, the container including a base stream and an enhanced stream, the base stream being acquired by performing prediction encoding processing for a base frame rate of image data, to the base frame rate of image data acquired by performing blending processing in units of temporally successive two pictures in a high frame rate of image, the enhanced stream being acquired by performing prediction encoding processing with after-blend-compensation image data, to the high frame rate of image data, the after-blend-compensation image data being acquired by performing, with the high frame rate of image data, processing inverse to the blending processing, to the base frame rate of image data, the after-blend-compensation image data including, when the high frame rate of image data includes image data of one-side pictures in the units of temporally successive two pictures, image data of the other-side pictures; and a processing unit configured to process only the base stream so as to acquire the base frame rate of image data or both of the base stream and the enhanced stream so as to acquire the high frame rate of image data, in which when performing decoding processing to the enhanced stream, the processing unit performs, with the high frame rate of enhanced frame image data acquired by the processing of the enhanced stream, the processing inverse to the blending processing, to the base frame rate of image data acquired by the processing of the base stream, so as to acquire the after-blend-compensation image data including, when the high frame rate of image data includes the image data of the one-side pictures in the units of temporally successive two pictures, the image data of the other-side pictures, the processing unit configured to use the after-blend-compensation image data as reference image data.

According to the present technology, the reception unit receives the container in the predetermined format, the container including the base stream and the enhanced stream. The base stream is acquired by the performance of the prediction encoding processing for the base frame rate of image data, to the base frame rate of image data acquired by the performance of the blending processing in the units of temporally successive two pictures in the high frame rate of image data.

In addition, the enhanced stream is acquired by the performance of the prediction encoding processing with the after-blend-compensation image data, to the high frame rate of image data, the after-blend-compensation image data being acquired by the performance of the processing inverse to the blending processing, with high frame rate of image data, to the base frame rate of image data, the after-blend-compensation image data including, when the high frame rate of image data includes the image data of the one-side pictures in the units of temporally successive two pictures, the image data of the other-side pictures.

The processing unit processes only the base stream so as to acquire the base frame rate of image data or both of the base stream and the enhanced stream so as to acquire the high frame rate of image data.

When performing the decoding processing to the enhanced stream, the processing unit performs, with the high frame rate of enhanced frame image data acquired by the processing of the enhanced stream, the processing inverse to the blending processing, to the base frame rate of image data acquired by the processing of the base stream, so as to acquire the after-blend-compensation image data including, when the high frame rate of image data includes the image data of the one-side pictures in the units of temporally successive two pictures, the image data of the other-side pictures, the processing unit configured to use the after-blend-compensation image data as the reference image data.

According to the present technology in this manner, the after-blend-compensation image data is used as the reference image data when the decoding processing is performed to the enhanced stream. Therefore, the decoding processing can be correctly performed to the enhanced stream so that the high frame rate of enhanced frame image data can be favorably acquired.

Note that, according to the present technology, for example, a layer of the enhanced stream may include blending ratio information in the blending processing, inserted, and the processing unit may use the blending ratio information in performing the processing inverse to the blending processing. Performing the processing inverse to the blending processing with the blending ratio information inserted into the layer of the enhanced stream in this manner, can easily and appropriately perform the processing.

In addition, according to the present technology, for example, each access unit of the enhanced stream may include phase information indicating to which of the temporally successive two pictures the access unit corresponds, and the processing unit may use the phase information in performing the processing inverse to the blending processing. Performing the processing inverse to the blending processing with the phase information inserted into each access unit of the enhanced stream in this manner, can easily and appropriately perform the processing.

In addition, according to a different concept of the present technology, a reception device includes: a reception unit configured to receive a container in a predetermined format, the container including a base stream and an enhanced stream, the base stream being acquired by performing encoding processing to a base frame rate of image data acquired by performing blending processing in units of temporally successive two pictures in a high frame rate of image data, the enhanced stream being acquired by performing encoding processing to the high frame rate of image data; and a processing unit configured to process only the base stream so as to acquire the base frame rate of image data or both of the base stream and the enhanced stream so as to acquire the high frame rate of image data.

According to the present technology, the reception unit receives the container in the predetermined format, the container including the base stream and the enhanced stream. The base stream is acquired by performing encoding processing to the base frame rate of image data acquired by the performance of the blending processing in the units of temporally successive two pictures in the high frame rate of image data. The enhanced stream is acquired by performing encoding processing to the high frame rate of image data.

The processing unit processes only the base stream so as to acquire the base frame rate of image data or both of the base stream and the enhanced stream so as to acquire the high frame rate of image data.

According to the present technology in this manner, only the base stream is processed so that the base frame rate of image data is acquired. Therefore, a receiver having a decode capability processable to the base frame rate of image data, processes the base stream so as to acquire the base frame rate of image data, so that smooth images can be displayed as a moving image and additionally frame interpolation processing by low load computing in display processing can avoid causing a problem in image quality.

In addition, according to the present technology, both of the base stream and the enhanced stream are processed so that the high frame rate of image data is acquired. Therefore, a receiver having a decode capability processable to the high frame rate (high frame rate) of image data, processes the enhanced stream so as to acquire the high frame rate of image data, so that image display in the high frame rate can be favorably performed.

Effects of the Invention

According to the present technology, the normal frame rate (the base frame rate) of image data and the high frame rate of image data can be favorably transported. Note that, the effects described here are not necessarily limited, and any of the effects described in the present disclosure may be provided.

BRIEF DESCRIPTION OF DRAWINGS

FIG. 4 is a block diagram of an exemplary configuration of the transmission device.

FIG. 5 is a block diagram of an exemplary configuration of a preprocessor.

FIG. 6 is a diagram of an exemplary relationship between input data (image data P) and output data (image data Qb and image data Qe) of the preprocessor.

FIG. 13 is a diagram of an exemplary case where blend compensation is performed to the picture of "Blended(n)th" being a reference picture, with the coefficient of the blending processing satisfying the following expression: $\alpha=\frac{1}{2}$ (thus, $\beta=\frac{1}{2}$).

FIG. 16 is a diagram of an exemplary case where the blend compensation is performed to the picture of "Blended (n)th" being the reference picture, with the coefficient of the blending processing satisfying the following expression: $\alpha=\frac{2}{3}$ (thus, $\beta=\frac{1}{3}$).

FIG. 18 illustrates tables of an exemplary structure of inverse blending layer prediction SEI and the descriptions of main information in the exemplary structure.

FIG. 19 illustrates tables of an exemplary structure of PPS and the descriptions of main information in the exemplary structure.

FIG. 20 illustrates tables of an exemplary structure of a video scalability information descriptor and the descriptions of main information in the exemplary structure.

MODE FOR CARRYING OUT THE INVENTION

A mode for carrying out the invention (hereinafter, referred to as an "embodiment") will be described below. Note that the descriptions will be given in the following order.
1. Embodiment
2. Modification

1. Embodiment

[Transmission and Reception System]

Figure 1:
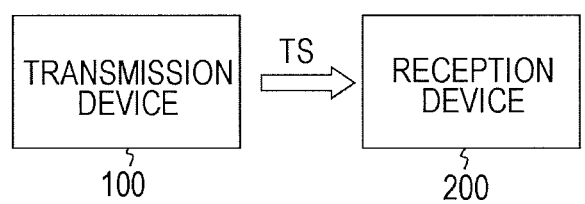
FIG. 1 is a block diagram of an exemplary configuration of a transmission and reception system according to an embodiment.

FIG. 1 illustrates an exemplary configuration of a transmission and reception system 10 according to the embodiment. The transmission and reception system 10 includes a transmission device 100 and a reception device 200.

The transmission device 100 transmits a transport stream TS as a container through a broadcast wave. The transport stream TS includes a base stream (a base video stream) and an enhanced stream (an enhanced video stream) acquired by processing a high frame rate of image data, according to the embodiment, 120 fps of image data (moving image data). According to the embodiment, the base stream and the enhanced stream each have a NAL unit structure.

Here, the base stream is acquired by performing prediction encoding processing for a base frame rate of image data (a normal frame rate), to the base frame rate of image data acquired by performing blending processing in units of temporally successive two pictures in the high frame rate of image data. The base stream includes, as an access unit, encoded image data per picture in the base frame rate of image data. The base frame rate of image data is 60 fps of image data.

In addition, the enhanced stream is acquired by adaptably performing prediction encoding processing with after-blend-compensation image data or prediction encoding processing for the high frame rate of image data, to the high frame rate of image data. The enhanced stream includes, as an access unit, encoded image data per picture in the high frame rate of image data.

Here, the after-blend-compensation image data is image data acquired by performing, with the high frame rate of image data, processing inverse to the blending processing, to the base frame rate of image data, the image data including, when the high frame rate of image data includes the image data of one-side pictures in the units of the temporally successive two pictures, the image data of the other-side pictures. In this manner, the after-blend-compensation image data is used as reference image data so that a predicted residual can be inhibited from increasing.

Figure 2:
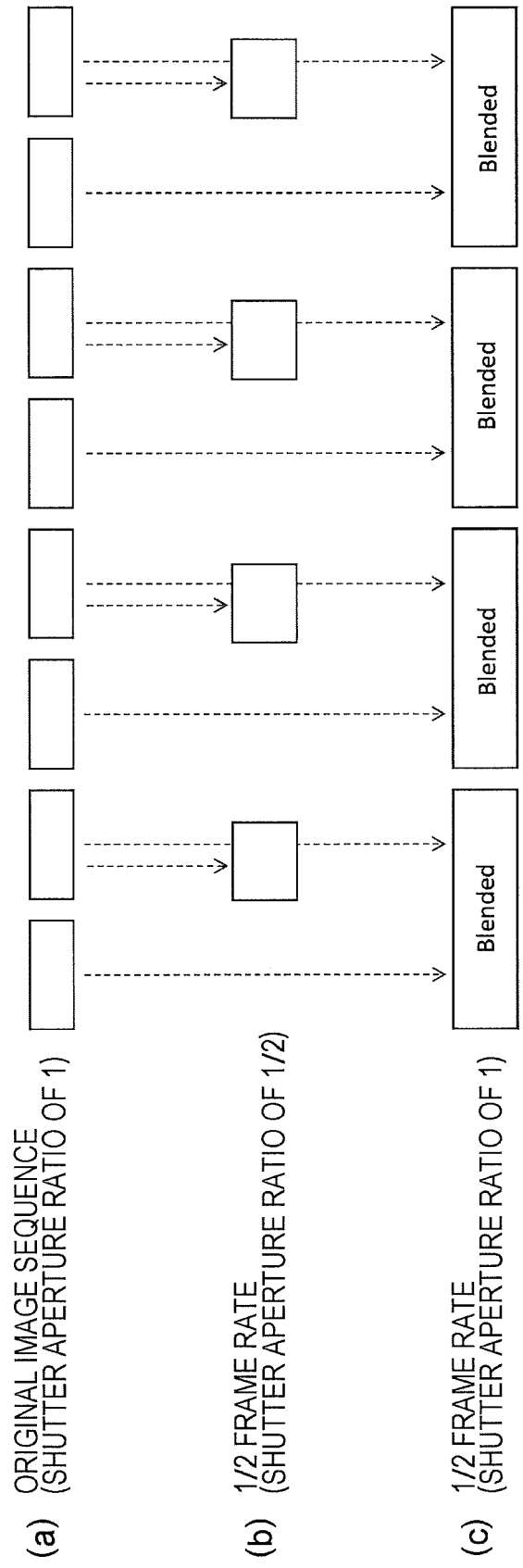
FIG. 2 is a diagram of exemplary conversion processing of a frame rate.

Here, the high frame rate of image data is defined as an original image sequence, as illustrated in FIG. 2(a). In this case, the base frame rate of image data acquired by the performance of the bending processing in the units of temporally successive two pictures, has a shutter aperture ratio of 1 (100%) to a time covered by the original image sequence, as illustrated in FIG. 2(c). Note that, the base frame rate of image data acquired by extraction of the image data of one-side pictures in the units of successive two pictures, has a shutter aperture ratio of ½ (50%) to the time covered by the original image sequence, as illustrated in FIG. 2(b).

Blending ratio information in the blending processing, is inserted into a layer of the enhanced stream. According to the embodiment, a SEI NAL unit having the blending ratio information is inserted into the enhanced stream or the blending ratio information is inserted into a PPS NAL unit of the enhanced stream. On the reception side, the processing inverse to the blending processing, can be easily and appropriately performed with the blending ratio information.

Into each access unit of the enhanced stream, phase information indicating to which of the temporally successive two pictures the access unit corresponds, is inserted. According to the embodiment, a SEI NAL unit having the phase information is inserted into each access unit of the enhanced stream or the phase information is inserted into a PPS NAL unit of each access unit of the enhanced stream. On the reception side, the processing inverse to the blending processing, can be easily and appropriately performed with the phase information.

Identification information indicating that the image data included in the base stream includes the image data acquired by the performance of the blending processing, is inserted into a layer of the container. According to the embodiment, a descriptor including the identification information described, is inserted in a video elementary stream loop arranged corresponding to the enhanced stream under a program map table (PMT). On the reception side, it can be easily recognized that the image data included in the base stream includes the image data acquired by the performance of the blending processing, from the identification information.

The reception device 200 receives the transport stream TS described above transmitted from the transmission device 100 through the broadcast wave. In a case where having a decode capability processable to 60 fps of image data, the reception device 200 processes only the base stream included in the transport stream TS and acquires the base frame rate of image data (60 fps) so as to perform image reproduction.

Meanwhile, in a case where having a decode capability processable to 120 fps of image data, the reception device 200 processes both of the base stream and the enhanced stream included in the transport stream TS and acquires the high frame rate of image data (120 fps) so as to perform image reproduction.

Here, in performing decoding processing to the enhanced stream and acquiring the high frame of image data, the reception device 200 uses, as the reference image data, the after-blend-compensation image data acquired by performing, with the high frame rate of image data acquired by the processing of the enhanced stream, the processing inverse to the bending processing, to the base frame rate of image data acquired by the processing of the base stream, the after-blend-compensation image data including, when the high frame rate of image data includes the image data of one-side pictures in the units of temporally successive two pictures, the image data of the other-side pictures. With this arrangement, the decoding processing is correctly performed to the enhanced stream so that the high frame rate of image data is favorably acquired.

Here, in performing the processing inverse to the blending processing, the blending ratio information in the blending processing, inserted into the layer of the enhanced stream, is used together with the phase information inserted into each access unit of the enhanced stream. With this arrangement, the processing inverse to the blending processing, is easily and appropriately performed, and as a result, the decoding processing of the enhanced stream is favorably performed.

Figure 3:
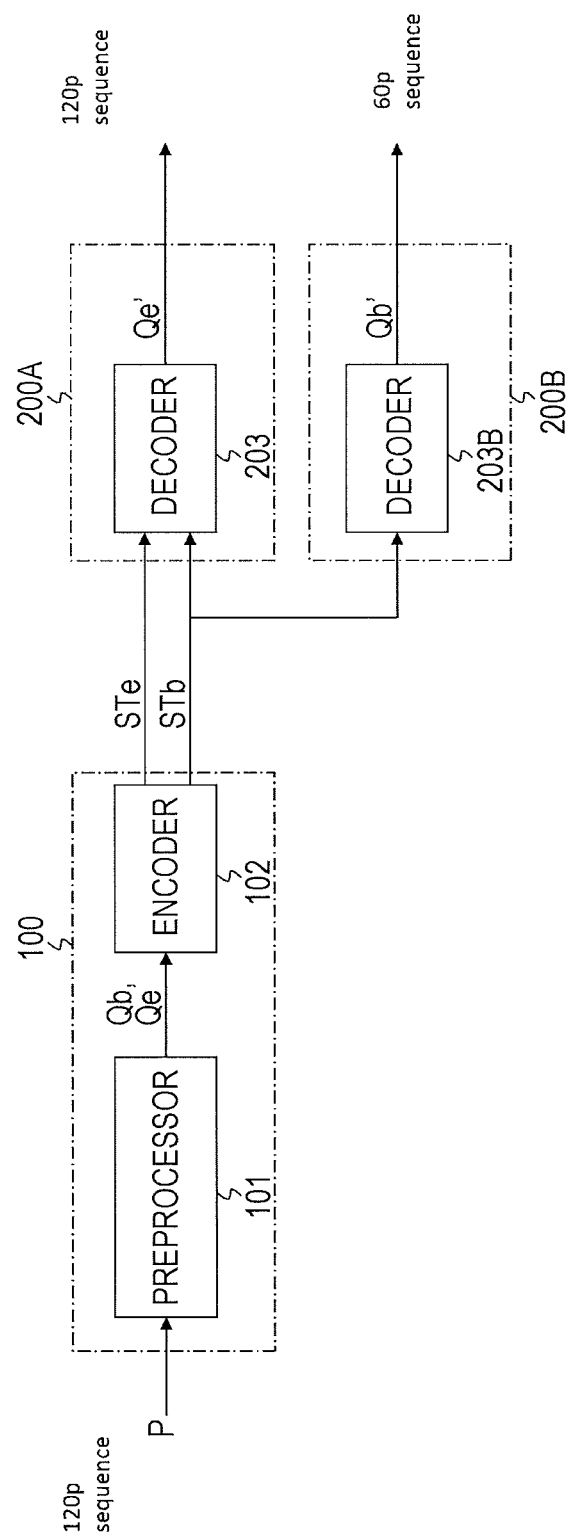
FIG. 3 is a diagram of an overview of processing in a transmission device and a reception device.

FIG. 3 illustrates an overview of processing in the transmission device 100 and the reception device 200. A sequence of 120 P of image data P is input into the transmission device 100. In the transmission device 100, a preprocessor 101 processes the image data P so as to acquire a base frame rate of image data Qb (60 fps) and a high frame rate of image data Qe (120 fps). Then, in the transmission device 100, an encoder 102 performs encoding processing to the image data Qb and the image data Qe so as to acquire a base stream STb and an enhanced stream STe. The transmission device 100 transmits the two streams STb and STe to the reception device 200.

In a reception device 200A having a decode capability processable to 120 fps of image data, a decoder 203 performs decoding processing to the two streams STb and STe so as to acquire a high frame rate of image data Qe' as a sequence of 120 P of image data. Meanwhile, in a reception device 200B having a decode capability processable to 60 fps of image data, a decoder 203B performs decoding processing to the stream STb so as to acquire a base frame rate of image data Qb' as a sequence of 60 P of image data.

[Configuration of Transmission Device]

FIG. 4 illustrates an exemplary configuration of the transmission device 100. The transmission device 100 includes the preprocessor 101, the encoder 102, a multiplexer 103, and a transmission unit 104. The preprocessor 101 receives the 120 fps of image data P so as to output the base frame rate of image data Qb and the high frame rate of image data Qe.

Here, the preprocessor 101 performs blending processing in units of temporally successive two pictures in the 120 fps of image data P, so as to acquire the base frame rate of image data Qb. In addition, the preprocessor 101 outputs the 120 fps of image data P remaining intact, as the high frame rate of image data Qe.

FIG. 5 illustrates an exemplary configuration of the preprocessor 101. The preprocessor 101 includes delay circuits 111 and 114 each that performs delaying by one frame in 120 fps, a computing circuit 112, and a latch circuit 113 that performs latching with a latch pulse of 60 Hz synchronized with the delay circuits 111 and 114.

The 120 fps of image data P is delayed by one frame period by the delay circuit 111 and then is given a gain of alpha ($\alpha$) so as to be input into the computing circuit 112. Note that the following expression is satisfied: $\alpha=0$ to 1. Meanwhile, image data in the image data P, subsequent to an object to be delayed by the delay circuit 111, is given a gain of beta ($\beta$) so as to be input into the computing circuit 112 through no delay circuit 111. Note that the following expression is satisfied: $\beta=1-\alpha$.

The computing circuit 112 adds the output of the delay circuit 111 and the 120 fps of image data P. Here, when the pieces of image data of temporally successive two pictures in the image data P, are defined as A and B, a blended output of "$\alpha*A+\beta*B$" is acquired as the output of the computing circuit 112 at timing at which the delay circuit 111 outputs the A. The output of the computing circuit 112 is input into the latch circuit 113.

The latch circuit 113 latches the output of the computing circuit 112 with the latch pulse of 60 Hz, so as to acquire the base frame rate of image data Qb (60 fps) to which the bending processing has been performed in the units of the temporally successive two pictures in the image data P. In addition, the delay circuit 111 delays the 120 fps of image data P by one frame period so as to adjust timing with the base frame rate of image data Qb, so that the 120 fps of image data P is output as the high frame rate of image data Qe (120 fps).

FIGS. 6(*a*) and 6(*b*) schematically illustrate an exemplary relationship between the input data (the image data P) of the preprocessor 101 and the output data (the image data Qb and the image data Qe) of the preprocessor 101. The respective pieces of image data F1', F3', F5', and F7' of pictures in the base frame rate of image data Qb (60 fps) and the respective pieces of image data F1, F2, F3, F4, F5, F6, F7, and F8 of pictures in the high frame rate of image data Qe (120 fps) are acquired corresponding to the respective pieces of image data F1, F2, F3, F4, F5, F6, F7, and F8 of the pictures in the 120 fps of image data P.

Referring back to FIG. 4, the encoder 102 performs the encoding processing to the image data Qb and the image data Qe acquired by the preprocessor 101, so as to generate the base stream and the enhanced stream. Here, the encoder 102 performs prediction encoding processing for the base frame rate of image data, to the base frame rate of image data Qb, so as to acquire the base stream STb. In addition, the encoder 102 adaptably performs prediction encoding processing with the after-blend-compensation image data or prediction encoding processing for the high frame rate of image data, to the high frame rate of image data Qe, so as to acquire the enhanced stream STe.

Here, with the high frame rate of image data, the encoder 102 performs processing inverse to the blending processing, to the base frame rate of image data so as to acquire image data as the after-blend-compensation image data, the image data including, when the high frame rate of image data includes the image data of one-side pictures in the units of temporally successive two pictures, the image data of the other-side pictures.

Figure 7:
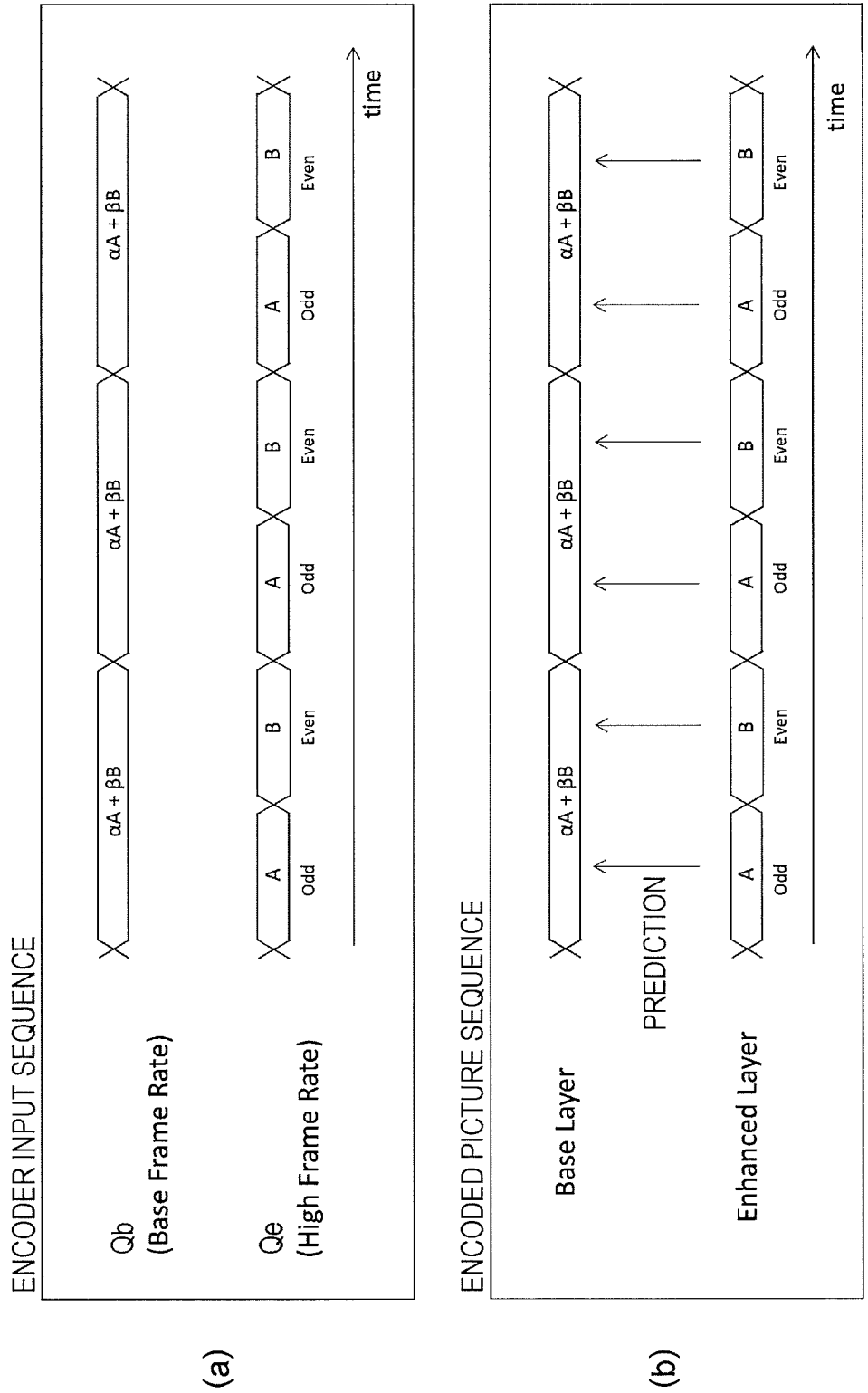
FIG. 7 is a diagram illustrating the sequences of a base frame rate of image data Qb (60 fps) and a high frame rate of image data Qe (120 fps) to be input into an encoder, and the sequences of encoded pictures in the encoder.

FIG. 7(*a*) illustrates the sequence of the base frame rate of image data Qb (60 fps) and the sequence of the high frame rate of image data Qe (120 fps) to be input into the encoder 102. FIG. 7(*b*) illustrates the sequences of encoded pictures in the encoder 102. The base frame rate of image data Qb is encoded as a base layer (Base Layer) and the high frame rate of image data Qe is encoded as an enhanced layer (Enhanced Layer).

Here, in a case where inter-layer prediction encoding is performed to the high frame rate of image data Qe, for encoding of the image data of the pictures at odd positions and the image data of the pictures at even positions in the units of temporally successive two pictures in the high frame rate of image data Qe, the image data of the pictures in the base frame rate of image data Qb acquired by the performance of the blending processing in the unit of temporally successive two pictures, is used as reference image data. Note that, as described above, practically, blend compensation is performed to the image data of the picture in the base frame rate of image data Qb and the after-blend compensation image data is used as the reference image data.

Figure 8:
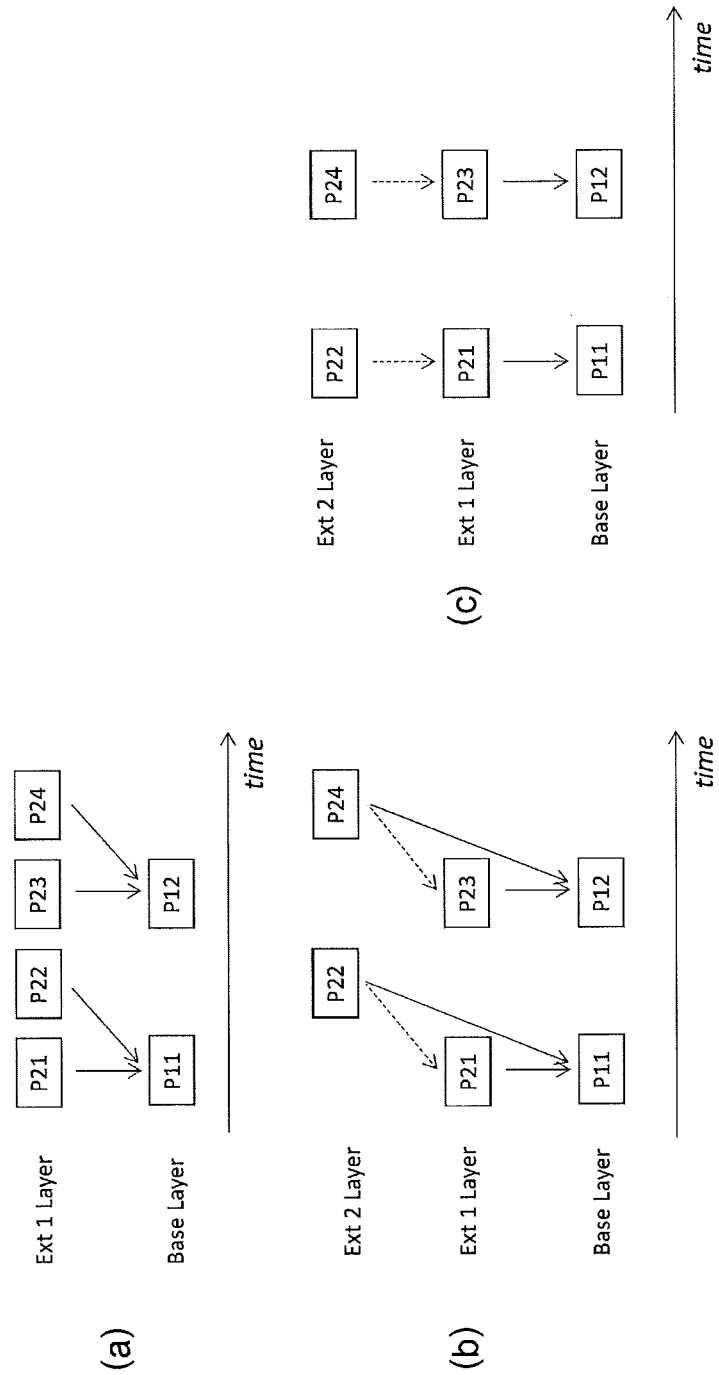
FIG. 8 is a diagram illustrating exemplary layer configurations and exemplary predictions.

FIG. 8 illustrates exemplary layer configurations and exemplary predictions. FIG. 8(*a*) illustrates an exemplary layer configuration including one base layer (Base Layer) and one enhanced layer (Ext 1 Layer). In the enhanced layer (Ext 1 Layer), [P21, P22] and [P23, P24] each indicate a unit of temporally successive two pictures. In addition, in the base layer (Base Layer), [P11] and [P12] each indicate a picture acquired by the performance of the blending processing in the unit of temporally successive two pictures.

In the illustration, the solid arrows each indicate a reference relationship in inter-layer prediction. In this case, each picture in the enhanced layer (Ext 1 Layer) is encoded with reference to the corresponding picture in the base layer (Base Layer).

FIG. 8(*b*) illustrates an exemplary layer configuration including one base layer (Base Layer) and two enhanced layers (Ext 1 Layer and Ext 2 Layer). The enhanced layer 1 (Ext 1 Layer) includes the pictures at the odd positions in units of temporally successive two pictures, and the enhanced layer 2 (Ext 2 Layer) includes the pictures at the even positions in the units of temporally successive two pictures.

In this case, encoding timings for the pictures in the enhanced layer 1 (Ext 1 Layer) are the same as encoding timings for the pictures in the base layer (Base Layer), but encode timings for the pictures in the enhanced layer 2 (Ext 2 Layer) are intermediate between the encoding timings for the pictures in the base layer (Base Layer).

In the illustration, the solid arrows and the dashed arrows each indicate a reference relationship in inter-layer prediction. In this case, each picture in the enhanced layer 1 (Ext 1 Layer) is encoded with reference to the corresponding picture in the base layer (Base Layer). In addition, each picture in the enhanced layer 2 (Ext 2 Layer) is encoded with reference to the corresponding picture in the base layer (Base Layer) or is encoded with reference to the corresponding picture in the enhanced layer 1 (Ext 1 Layer). Note that, in a case where such a configuration is encoded, the enhanced layer 1 and the enhanced layer 2 are arranged into one layer so that the identification of each of the two can be distinguished with a hierarchy (temporal_id).

FIG. 8(c) illustrates an exemplary layer configuration including one base layer (Base Layer) and two enhanced layers (Ext 1 Layer and Ext 2 Layer), similarly to the example of FIG. 8(b). In this case, encoding timings for the pictures in the enhanced layer 1 (Ext 1 Layer) are the same as encoding timings for the pictures in the base layer (Base Layer), and encode timings for the pictures in the enhanced layer 2 (Ext 2 Layer) are also the same as the encoding timings for the pictures in the base layer (Base Layer).

In the illustration, the solid arrows and the dashed arrows each indicate a reference relationship in inter-layer prediction. In this case, each picture in the enhanced layer 1 (Ext 1 Layer) is encoded with reference to the corresponding picture in the base layer (Base Layer). In addition, each picture in the enhanced layer 2 (Ext 2 Layer) is encoded with reference to the corresponding picture in the enhanced layer 1 (Ext 1 Layer).

Figure 9:
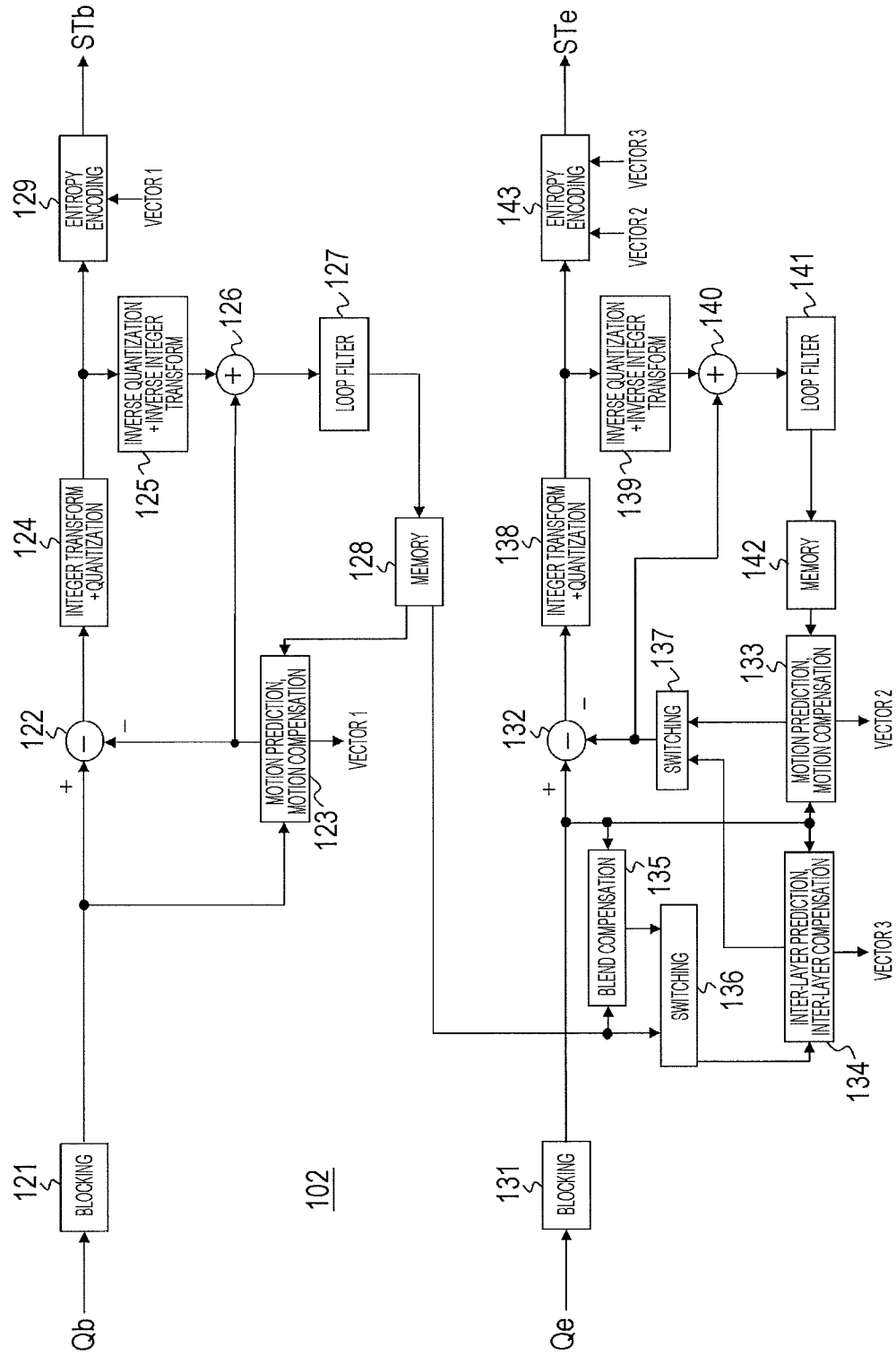
FIG. 9 is a block diagram of an exemplary configuration of an encoding processing part of the encoder (a base layer and one enhanced layer).

FIG. 9 illustrates an exemplary configuration of an encoding processing part of the encoder 102. The exemplary configuration corresponds to the exemplary layer configuration including the base layer (Base Layer) and the one enhanced layer (Ext 1 Layer) (refer to FIG. 8(a)).

The encoder 102 includes a blocking circuit 121, a subtracting circuit 122, a motion prediction/motion compensation circuit 123, an integer transform/quantization circuit 124, an inverse quantization/inverse integer transform circuit 125, an adding circuit 126, a loop filter 127, a memory 128, and an entropy encoding circuit 129.

In addition, the encoder 102 includes a blocking circuit 131, a subtracting circuit 132, a motion prediction/motion compensation circuit 133, an inter-layer prediction/inter-layer compensation circuit 134, a blend compensation circuit 135, switching circuits 136 and 137, an integer transform/quantization circuit 138, an inverse quantization/inverse integer transform circuit 139, an adding circuit 140, a loop filter 141, a memory 142, and an entropy encoding circuit 143.

The base frame rate of image data Qb is input into the blocking circuit 121. The blocking circuit 121 divides the image data of each picture included in the image data Qb, into blocks each being an encoding processing unit (macroblock: MB). Each block is sequentially supplied to the subtracting circuit 122. The motion prediction/motion compensation circuit 123 acquires a predicted reference block to which motion compensation has been performed, per block, on the basis of the reference picture image data stored in the memory 128.

Each predicted reference block acquired by the motion prediction/motion compensation circuit 123, is sequentially supplied to the subtracting circuit 122. The subtracting circuit 122 performs subtracting processing with the predicted reference block per block acquired by the blocking circuit 121, so as to acquire a predicted error. The predicted error per block is integral-transformed (e.g., DCT transform) and then is quantized by the integer transform/quantization circuit 124.

The quantized data per block, acquired by the integer transform/quantization circuit 124, is supplied to the inverse quantization/inverse integer transform circuit 125. The inverse quantization/inverse integer transform circuit 125 performs inverse quantization and further performs inverse integer transform to the quantized data, so as to acquire a predicted residual. The predicted residual is supplied to the adding circuit 126.

The adding circuit 126 adds the predicted residual with the predicted reference block to which the motion compensation has been performed, so as to acquire a block. The loop filter 127 removes quantization noise from the block, and then the block is accumulated in the memory 128.

In addition, the quantized data per block, acquired by the integer transform/quantization circuit 124, is supplied to the entropy encoding circuit 129, and then entropy encoding is performed so that the base stream STb being a prediction encoded result of the base frame rate of image data Qb is acquired. Note that, the base stream STb is added with information regarding, for example, a motion vector in each block, as MB header information, for decoding on the reception side.

In addition, the high frame rate of image data Qe is input into the blocking circuit 131. The blocking circuit 131 divides the image data of each picture included in the image data Qe, into blocks each being the encoding processing unit (macroblock: MB). Each block is sequentially supplied to the subtracting circuit 132.

The motion prediction/motion compensation circuit 133 acquires a predicted reference block for in-layer prediction, to which motion compensation has been performed, on the basis of the reference picture image data stored in the memory 142. The after-blend-compensation image data acquired by the blend compensation circuit 135 or the image data stored in the memory 128 is selectively supplied as the reference picture image data from the switching circuit 136 to the inter-layer prediction/inter-layer compensation circuit 134. In this case, even in a case where the prediction encoding processing with the base layer is performed, the processing can be performed through no blend compensation circuit 135. The inter-layer prediction/inter-layer compensation circuit 134 acquires a predicted reference block to which motion compensation has been performed, per block, on the basis of the reference picture image data.

The blend compensation circuit 135 is supplied with the reference picture image data (the base frame rate of image data) from the memory 128. In addition, the blend compensation circuit 135 is supplied with the output of the blocking circuit 131, namely, predicted-source picture image data (the high frame rate of image data). Note that the picture processing of the base layer and the picture processing of the enhanced layer are synchronously performed.

With the high frame rate of image data, the blend compensation circuit 135 performs the processing inverse to the blending processing, to the base frame rate of image data, so as to acquire image data as the after-blend-compensation image data, the image data including, when the high frame rate of image data includes the image data of one-side pictures in the units of temporally successive two pictures, the image data of the other-side pictures.

Then, in this case, the blend compensation circuit 135 acquires the after-blend-compensation image data per block (predicted block) acquired by the blocking circuit 131. In this case, image data over a range of more than the block is acquired as the after-blend compensation image data. That is, in the blend compensation processing, data on the periphery of the block is to be computed in accordance with a range in which the motion vector shifts an object to be predicted.

Figure 10:
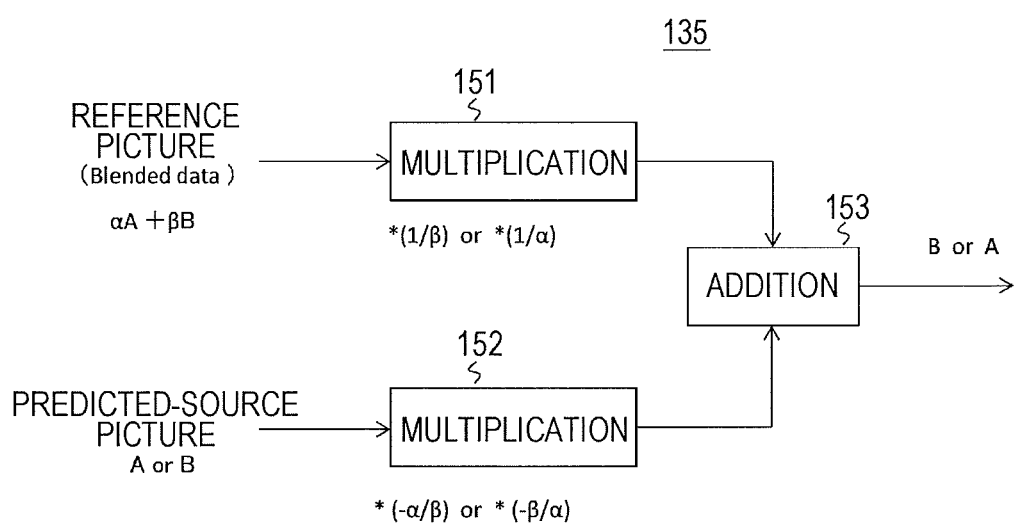
FIG. 10 is a block diagram of an exemplary configuration of a blend compensation circuit.

FIG. 10 illustrates an exemplary configuration of the blend compensation circuit 135. The blend compensation circuit 135 includes multiplying units 151 and 152 and an adding unit 153. The multiplying unit 151 correspondingly multiplies the reference picture image data (the base frame rate of image data [$\alpha A + \beta B$]) by a coefficient of ($1/\beta$) and a coefficient of ($1/\alpha$) when the high frame rate of image data includes the image data of the pictures at the odd positions and the image data of the pictures at the even positions in the units of temporally successive two pictures.

Similarly, the multiplying unit 152 correspondingly multiplies the predicted-source picture image data (the high frame rate of enhanced frame image data [A] and [B]) by a coefficient of ($-\alpha/\beta$) and a coefficient of ($-\beta/\alpha$) when the high frame rate of image includes the image data of the pictures at the odd positions and the image data of the pictures at the even positions in the units of temporally successive two pictures. Then, the adding unit 153 adds the output of the multiplying unit 151 and the output of the multiplying unit 152 so as to acquire the after-blend-compensation image data [B] and [A].

Here, $\alpha$ is, in the blending processing, a coefficient to be multiplied together with the image data A at the odd positions in the units of temporally successive two pictures, and $\beta$ is, in the blending processing, a coefficient to be multiplied together with the image data B at the even positions in the units of temporally successive two pictures (refer to FIG. 5).

Referring back to FIG. 9, the switching circuit 137 selects the predicted reference blocks for the in-layer prediction, acquired by the motion prediction/motion compensation circuit 133 or the predicted reference blocks for the inter-layer prediction, acquired by the inter-layer prediction/inter-layer compensation circuit 134, in units of blocks or in units of pictures, so as to perform supplying to the subtracting circuit 132. For example, the switching circuit 137 switches to reduce a residual component. In addition, for example, the switching circuit 137 forcibly switches to one side at a boundary in the sequence.

The subtracting circuit 132 performs subtracting processing with the predicted reference block, per block acquired by the blocking circuit 131, so as to acquire a predicted error. The predicted error per block is integral-transformed (e.g., DCT transform) and then is quantized by the integer transform/quantization circuit 138.

The quantized data per block, acquired by the integer transform/quantization circuit 138, is supplied to the inverse quantization/inverse integer transform circuit 139. The inverse quantization/inverse integer transform circuit 139 performs inverse quantization and further performs inverse integer transform to the quantized data, so as to acquire a predicted residual. The predicted error per block is supplied to the adding circuit 140.

The predicted reference block selected by the switching circuit 137 is supplied to the adding circuit 140. The adding circuit 140 adds the predicted residual with the predicted reference block to which the motion compensation has been performed, so as to acquire a block. The loop filter 141 removes quantization noise from the block, and then the block is accumulated in the memory 142.

In addition, the quantized data per block, acquired by the integer transform/quantization circuit 138, is supplied to the entropy encoding circuit 143, and then entropy encoding is performed so that the enhanced stream STe being a prediction encoded result of the high frame rate of image data Qe is acquired. Note that the enhanced stream STe is added with information regarding, for example, a motion vector in each block and the switching of the predicted reference blocks, as MB block information, for decoding on the reception side.

Figure 11:
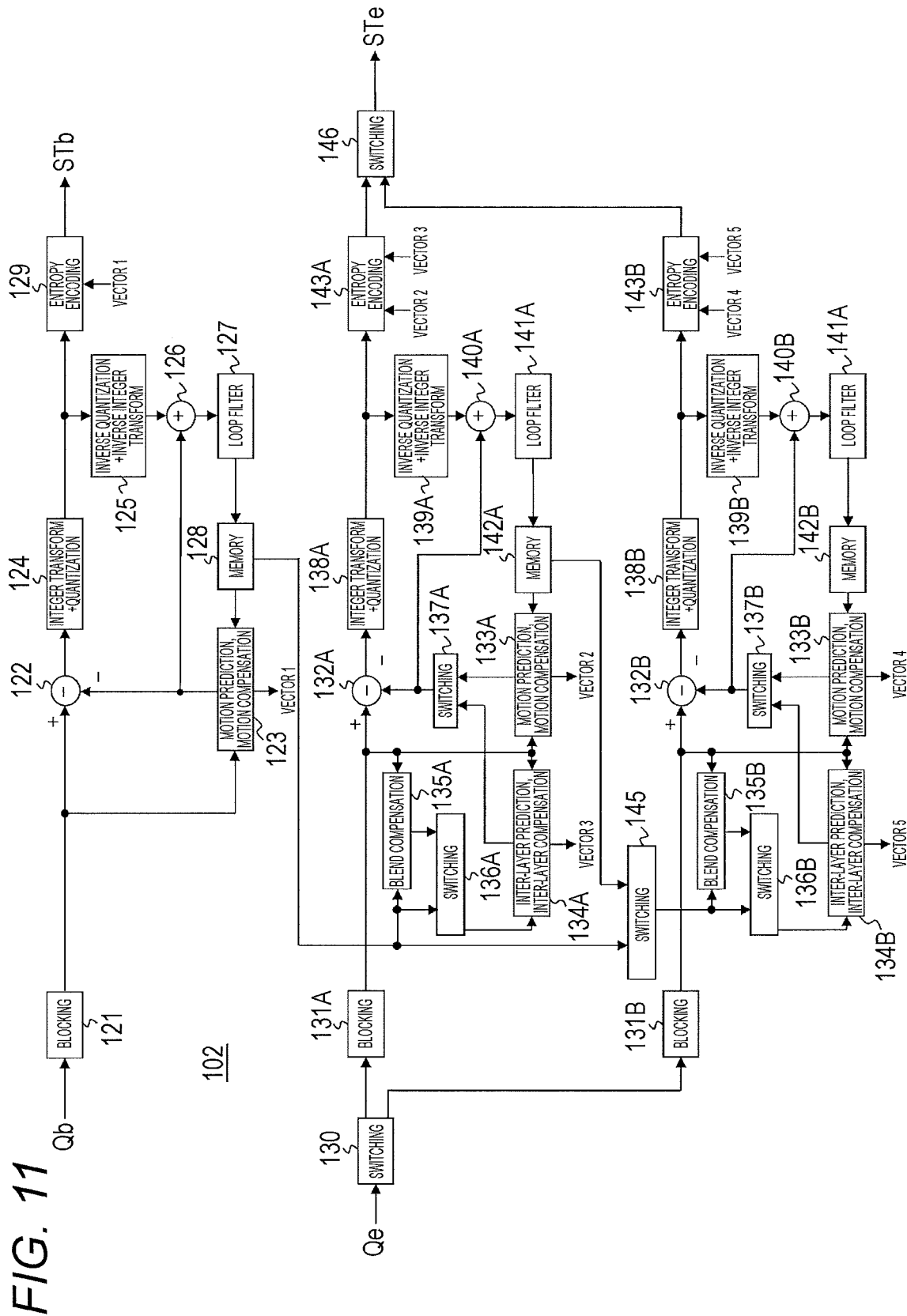
FIG. 11 is a block diagram of an exemplary configuration of the encoding processing part of the encoder (the base layer and two enhanced layers).

FIG. 11 also illustrates an exemplary configuration of the encoding processing part of the encoder 102. The exemplary configuration corresponds to the exemplary layer configuration including the base layer (Base Layer) and the two enhanced layers (Ext 1 Layer and Ext 2 Layer) (refer to FIGS. 8(b) and 8(c)). In FIG. 11, parts corresponding to those of FIG. 9 are denoted with the same reference signs, and thus the detailed descriptions thereof will be appropriately omitted.

The encoder 102 includes a blocking circuit 121, a subtracting circuit 122, a motion prediction/motion compensation circuit 123, an integer transform/quantization circuit 124, an inverse quantization/inverse integer transform circuit 125, an adding circuit 126, a loop filter 127, a memory 128, and an entropy encoding circuit 129.

In addition, the encoder 102 includes a switching circuit 130, a blocking circuit 131A, a subtracting circuit 132A, a motion prediction/motion compensation circuit 133A, an inter-layer prediction/inter-layer compensation circuit 134A, a blend compensation circuit 135A, switching circuits 136A and 137A, an integer transform/quantization circuit 138A, an inverse quantization/inverse integer transform circuit 139A, an adding circuit 140A, a loop filter 141A, a memory 142A, and an entropy encoding circuit 143A.

In addition, the encoder 102 includes a blocking circuit 131B, a subtracting circuit 132B, a motion prediction/motion compensation circuit 133B, an inter-layer prediction/inter-layer compensation circuit 134B, a blend compensation circuit 135B, switching circuits 136B and 137B, an integer transform/quantization circuit 138B, an inverse quantization/inverse integer transform circuit 139B, an adding circuit 140B, a loop filter 141B, a memory 142B, an entropy encoding circuit 143B, and switching circuits 145 and 146.

Encoding processing to the base frame rate of image data Qb, namely, encoding processing of the base layer (Base Layer) is similar to that in the exemplary configuration of the encoding processing part of the encoder 102 of FIG. 9, and thus the detailed description thereof will be omitted. Encoding processing to the high frame rate of image data Qe is performed being divided into encoding processing of the enhanced layer 1 and encoding processing of the enhanced layer 2.

The switching circuit 130 assigns the image data of each picture in the high frame rate of image data Qe, to the image data of the picture to be handled in the encoding processing of the enhanced layer 1 or the image data of the picture to be handled in the encoding processing of the enhanced layer 2. In this case, the image data A of the pictures at the odd positions is supplied to a system for the encoding processing of the enhanced layer 1, in the units of temporally successive two pictures.

In FIG. 11, the system for the encoding processing of the enhanced layer 1 includes the respective circuits indicated with the reference signs denoted with "A". The system for the encoding processing of the enhanced layer 1 has a configuration similar to that of a system for the encoding processing of the enhanced layer in the exemplary configuration of the encoding processing part of the encoder 102 of FIG. 9, and an encoded stream of the enhanced layer 1 is acquired from the entropy encoding circuit 143A.

Note that the system for the encoding processing of the enhanced layer 1 performs prediction encoding processing with the base layer or prediction encoding processing in the enhanced layer 1. Even in a case where the prediction encoding processing with the base layer is performed, the processing through no blend compensation circuit 135A can be performed by switching of the switching circuit 136A.

In addition, in FIG. 11, a system for the encoding processing of the enhanced layer 2 includes the respective circuits indicated with the reference signs denoted with "B". The system for the encoding processing of the enhanced layer 2 has a configuration similar to that of the system for the encoding processing of the enhanced layer in the exemplary configuration of the encoding processing part of the encoder 102 of FIG. 9, and an encoded stream of the enhanced layer 1 is acquired from the entropy encoding circuit 143B.

Note that the system for the encoding processing of the enhanced layer 2 performs prediction encoding processing with the base layer, prediction encoding processing with the enhanced layer 1, or prediction encoding processing in the enhanced layer 2. In a case where the prediction encoding processing with the base layer is performed, the switching circuit 145 selects the output of the memory 128. Meanwhile, in a case where the prediction encoding processing with the enhanced layer 1 is performed, the switching circuit 145 selects the output of the memory 142A. Even in a case where the prediction encoding processing with the base layer is performed, the processing through no blend compensation circuit 135B can be performed by switching of the switching circuit 136B.

The switching circuit 146 combines the encoded stream of the enhanced layer 1 acquired by the entropy encoding circuit 143A and the encoded stream of the enhanced layer 2 acquired by the entropy encoding circuit 143B, so that the enhanced stream STe being a prediction encoded result of the high frame rate of image data Qe is acquired.

As described above, the after-blend-compensation image data acquired by the blend compensation circuit 135 is used as the reference picture image data in the inter-layer prediction encoding processing so that the predicted residual can be reduced.

Figure 12:
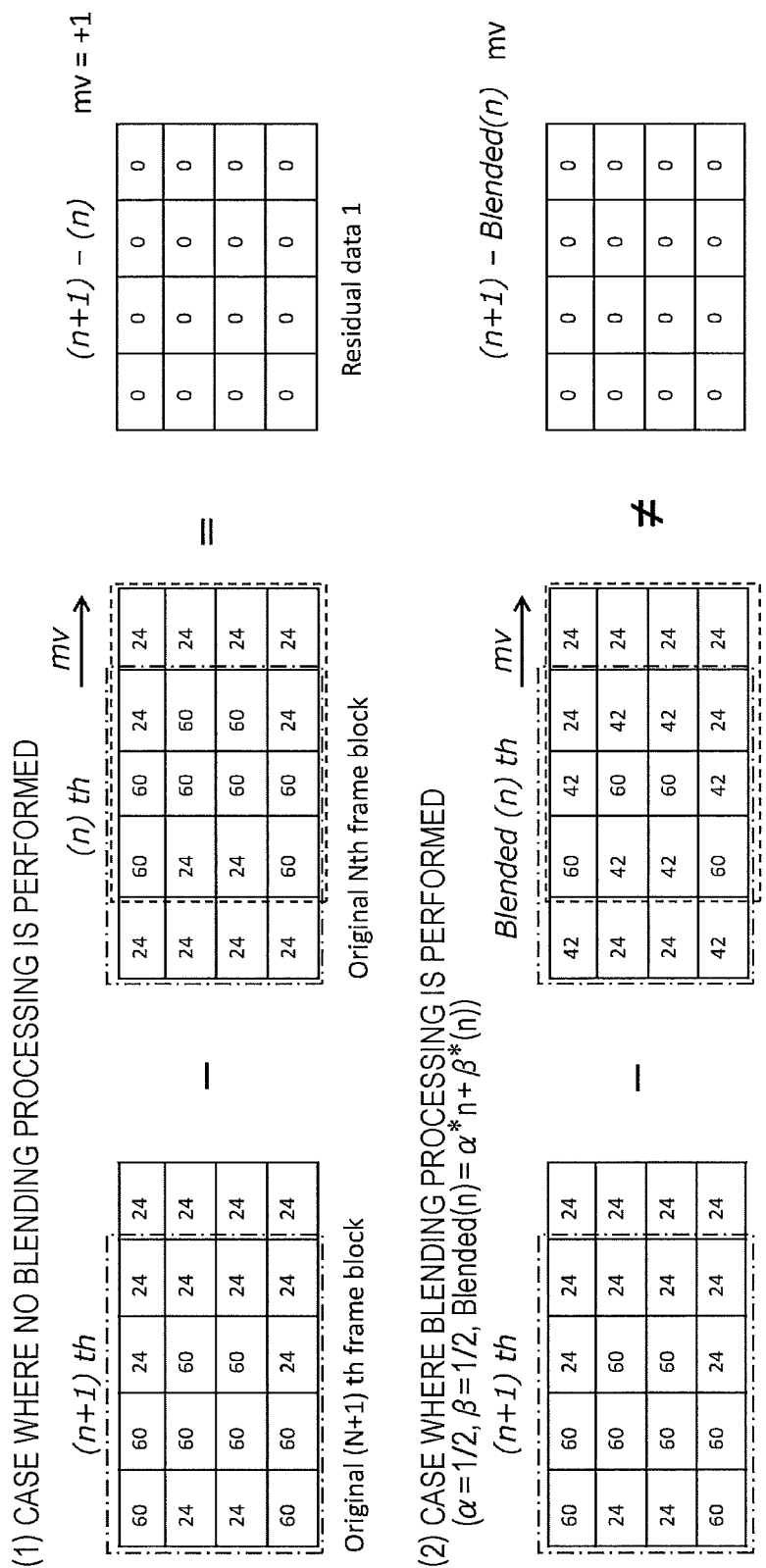
FIG. 12 is a diagram illustrating, in comparison, an exemplary predicted residual in a case where no blending processing is performed (1) and an exemplary predicted residual in a case where the blending processing is performed (2) with a coefficient of the blending processing exemplarily satisfying the following expression: $\alpha=\frac{1}{2}$ (thus, $\beta=\frac{1}{2}$).

FIG. 12 illustrates, in comparison, an exemplary predicted residual in a case where no blending processing is performed (1) and an exemplary predicted residual in a case where the blending processing is performed (2) with a coefficient of the blending processing exemplarily satisfying the following expression: $\alpha=\frac{1}{2}$ (thus, $\beta=\frac{1}{2}$). "(n)th" and "(n+1)th" indicate pictures (frames) in temporally back and forth adjacent relationship. Here, the picture of "(n+1) th" forms a predicted-source picture and the picture of "(n)th" forms a reference picture. The picture of "Blended(n)th" indicates the reference picture to which the blending processing has been performed.

The rectangular box with a dot-and-dash line in the predicted-source picture indicates the range of a predicted block (a block in a processing unit), and the rectangular box with a dot-and-dash line in the reference picture indicates the range of a reference block corresponding to the range of the predicted block. In addition, the rectangular box with a dashed line in the reference picture indicates the range of the reference block to which motion compensation has been performed by a motion vector my. Note that, for simplification, the block in the processing unit includes a 4×4 block in the example. The processing unit is not limited to this, and thus may be a block larger than the 4×4 block.

In the case where no blending processing is performed, in the input sequence in the illustration, prediction is performed with reference to the motion vector between the picture of "(n+1)th" and the picture of "(n)th" so that the predicted residual of "(n+1)−(n)" becomes zero. In contrast to this, in the case where the blending processing is performed, when prediction is performed between the picture of "(n+1)th" and the picture of "Blended(n)th" acquired by the performance of the blending processing to a similar input sequence, the predicted residual of "(n+1)−Blended(n)" does not become zero and a residual component of some kind occurs even if the prediction is performed with reference to the motion vector.

FIG. 13 illustrates an exemplary case where blend compensation is performed to the picture of "Blended(n)th" being the reference picture with the coefficient of the blending processing described above satisfying the following expression: $\alpha=\frac{1}{2}$ (thus, $\beta=\frac{1}{2}$). The example in the illustration corresponds to a case where the predicted-source picture is "B" in the blend compensation circuit 135 illustrated in FIG. 10. Note that the description for a case where the predicted-source picture is "A", will be omitted. In this case, the picture of "Blended (n)th" is multiplied by 2 ($=1/\alpha$) and the picture of "Blended(n)th" is multiplied by −1 ($=-\beta/\alpha$) so that the picture of "(n)th" before the blending processing is acquired as an after-blend-compensation picture (image data).

Figure 14:
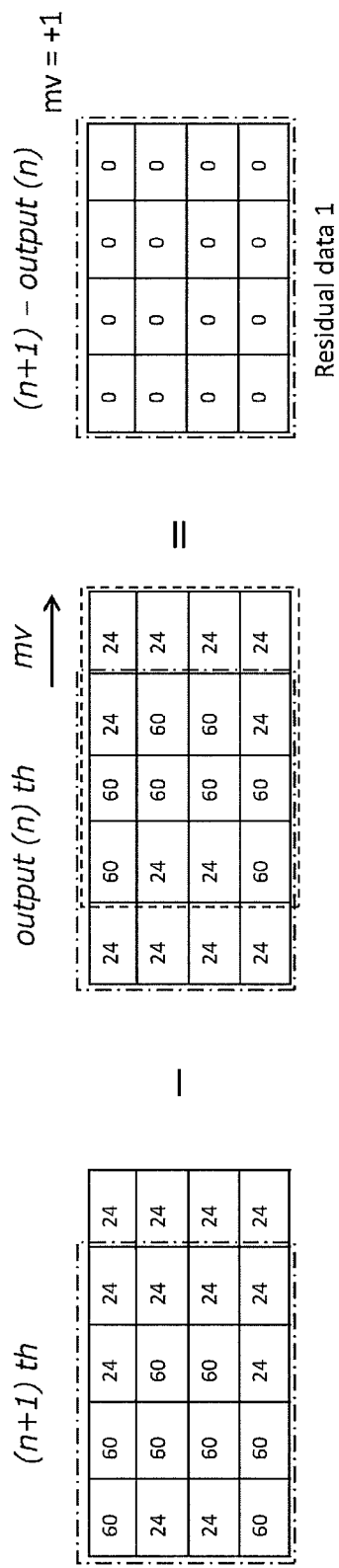
FIG. 14 is a diagram of an exemplary predicted residual with an after-blend-compensation picture (image data).

FIG. 14 illustrates an exemplary predicted residual in a case where the after-bend-compensation picture (image data) is used. In this case, prediction is performed with reference to the motion vector between the picture of "(n+1)th" and the after-blend-compensation picture of "output (n)th" so that the predicted residual of "(n+1)−(n)" becomes zero similarly to the case where no blending processing is performed, of (1) of FIG. 12.

Figure 15:
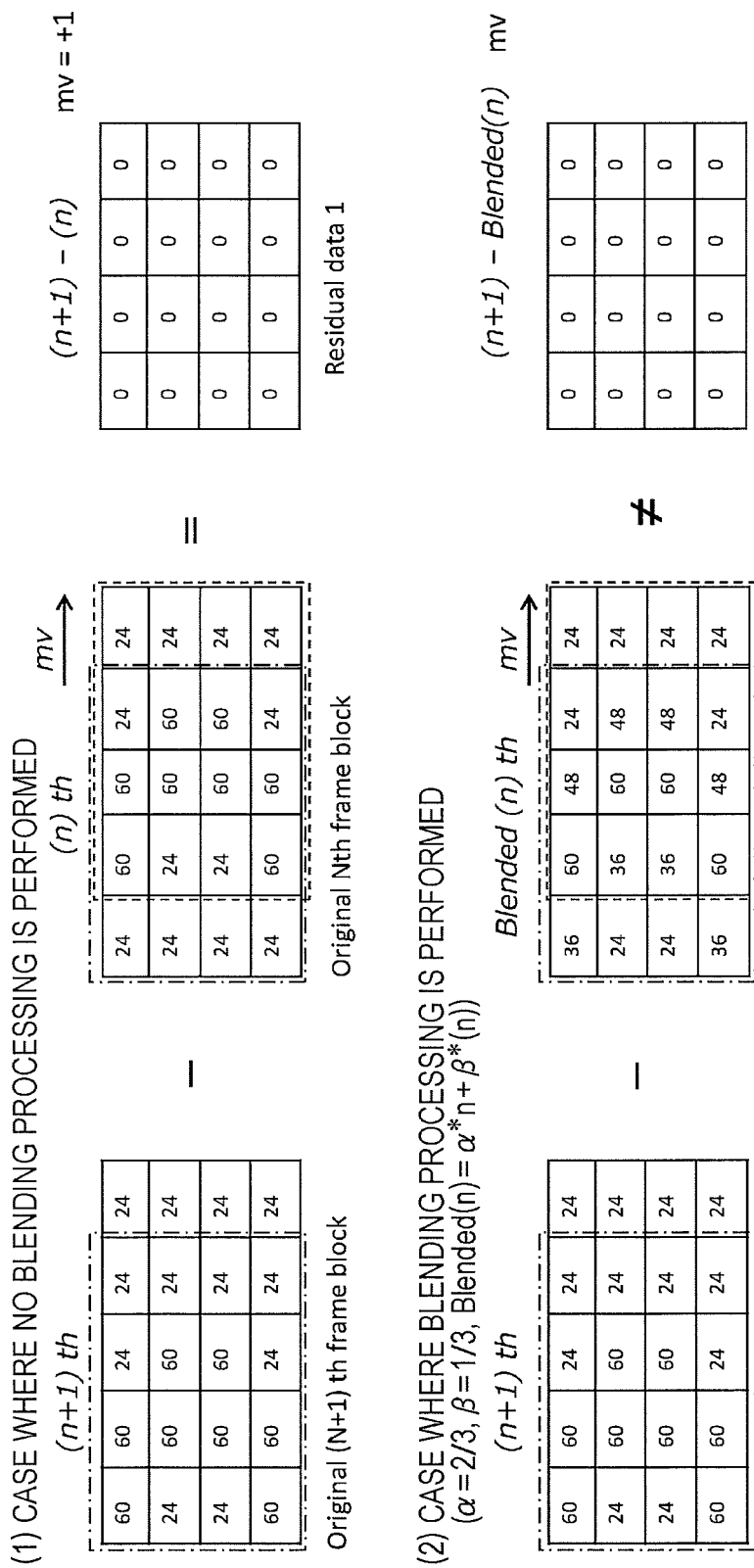
FIG. 15 is a diagram illustrating, in comparison, an exemplary predicted residual in a case where no blending processing is performed (1) and an exemplary predicted residual in a case where the blending processing is performed (2) with the coefficient of the blending processing exemplarily satisfying the following expression: $\alpha=\frac{2}{3}$ (thus, $\beta=\frac{1}{3}$).

In addition, FIG. 15 illustrates, in comparison, an exemplary predicted residual in a case where no blending processing is performed (1) and an exemplary predicted residual in a case where the blending processing is performed (2) with the coefficient of the blending processing exemplarily satisfying the following expression: $\alpha=\frac{2}{3}$ (thus, $\beta=\frac{1}{3}$). "(n)th" and "(n+1)th" indicate pictures (frames) in temporally back and forth adjacent relationship. Here, the picture of "(n+1)th" forms a predicted-source picture and the picture of "(n)th" forms a reference picture. The picture of "Blended(n)th" indicates the reference picture to which the blending processing has been performed.

The rectangular box with a dot-and-dash line in the predicted-source picture indicates the range of a predicted block (a block in a processing unit), and the rectangular box with a dot-and-dash line in the reference picture indicates the range of a reference block corresponding to the range of the predicted block. In addition, the rectangular box with a dashed line in the reference picture indicates the range of the reference block to which motion compensation has been performed by a motion vector my. Note that, for simplification, the block in the processing unit includes a 4×4 block in the example. The processing unit is not limited to this, and thus may be a block larger than the 4×4 block.

In the case where no blending processing is performed, in the input sequence in the illustration, prediction is performed with reference to the motion vector between the picture of "(n+1)th" and the picture of "(n)th" so that the predicted residual of "(n+1)−(n)" becomes zero. In contrast to this, in the case where the blending processing is performed, when prediction is performed between the picture of "(n+1)th" and the picture of "Blended(n)th" acquired by the performance of the blending processing to a similar input sequence, the predicted residual of "(n+1)−Blended(n)" does not become zero and a residual component of some kind occurs even if the prediction is performed with reference to the motion vector.

FIG. 16 illustrates an exemplary case where blend compensation is performed to the picture of "Blended(n)th" being the reference picture and the picture of "(n+1)th" being the predicted-source picture, with the coefficient of the blending processing described above satisfying the following expression: α=⅔ (thus, β=⅓). The example in the illustration corresponds to a case where the predicted-source picture is "B" in the blend compensation circuit 135 illustrated in FIG. 10. Note that the description for a case where the predicted-source picture is "A", will be omitted. In this case, the picture of "Blended(n)th" is multiplied by 3/2 (=1/α) and the picture of "Blended(n)th" is multiplied by −½ (=−β/α) so that the picture of "(n)th" before the blending processing is acquired as an after-blend-compensation picture (image data).

Figure 17:
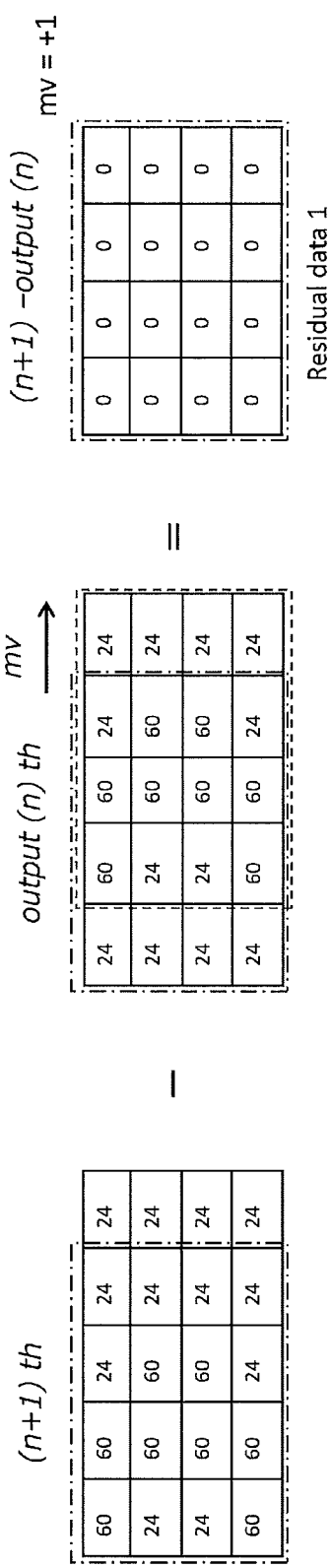
FIG. 17 is a diagram of an exemplary predicted residual with the after-blend-compensation picture (image data).

FIG. 17 illustrates an exemplary predicted residual in a case where the after-blend-compensation picture (image data) is used. In this case, prediction is performed with reference to the motion vector between the picture of "(n+1)th" and the after-blend-compensation picture of "output(n)th" so that the predicted residual of "(n+1)−(n)" becomes zero similarly to the case where no blending processing is performed, of (1) of FIG. 15.

In this manner, the after-blend-compensation image data is used as the reference picture image data so that the predicted residual can be reduced. Note that, the examples described above have given two examples in which the coefficients of the blending processing satisfy the following expressions: α=½ and β=½, or, α=⅔ and β=⅓. With the detailed description omitted, even in a case where the coefficients of the blending processing satisfy different expressions, a similar manner is made.

Referring back to FIG. 4, the encoder 102 inserts the blending ratio information in the blending processing, into the layer of the enhanced stream. The blending ratio information is used in the blend compensation processing in performing the decoding processing of the enhanced stream on the reception side. In addition, into each access unit of the enhanced stream, the encoder 102 inserts the phase information indicating to which of the temporally successive two pictures the access unit corresponds. The phase information is used in the blend compensation processing in performing the decoding processing of the enhanced stream on the reception side. That is because switching is required between the coefficients in the blend compensation processing, on the basis of correspondence to which of the temporally successive two pictures (refer to FIG. 10).

According to the embodiment, a SEI NAL unit having the blending ratio information and the phase information is inserted into each access unit of the enhanced stream, or the blending ratio information and the phase information are inserted into a PPS NAL unit of each access unit of the enhanced stream.

In a case where the SEI NAL unit having the blending ratio information and the phase information is inserted into each access unit of the enhanced stream, the encoder 102 inserts inverse blending layer prediction SEI (inverse_blending_layer_prediction_SEI) to be newly defined, into a portion of "SEIs" of each access unit (AU).

FIG. 18(*a*) illustrates an exemplary structure (Syntax) of the inverse blending layer prediction SEI, and FIG. 18(*b*) illustrates the descriptions (Semantics) of main information in the exemplary structure. The 4-bit field of "blend_coef_alpha" indicates the coefficient α. The 4-bit field of "blend_coef_beta" indicates the coefficient β. The 1-bit field of "picture_phase" indicates the phase of the picture. For example, "1" indicates the odd position and "0" indicates the even position.

In addition, in the case where the blending ratio information and the phase information are inserted into the PPS NAL unit of each access unit of the enhanced stream, the encoder 102 defines the blending ration information and the phase information into an extended portion of PPS (Picture_parameter_set).

FIG. 19(*a*) illustrates an exemplary structure (Syntax) of the PPS, and FIG. 19(*b*) illustrates the descriptions (Semantics) of main information in the exemplary structure. The 1-bit field of "pps_blend_info_extention_flag" is flag information indicating whether the blending ratio information and the phase information are present in the extended portion. For example, "1" indicates the presence, and "0" indicates the absence.

When the "pps_blend_info_extention_flag" is "1", the field of "pps_blend_info_extention( )" is present. FIG. 19(*c*) illustrates an exemplary structure (Syntax) of the "pps_blend_info_extention( )". The 4-bit field of "blend_coef_alpha" indicates the coefficient α. The 4-bit field of "blend_coef_beta" indicates the coefficient β. The 1-bit field of "picture_phase" indicates the phase of the picture. For example, "1" indicates the odd position and "0" indicates the even position.

Referring back to FIG. 4, the multiplexer 103 performs packetized elementary stream (PES) packetization and further performs transport packetization to the base stream STb and the enhanced stream STe generated by the encoder 102, so as to perform multiplexing, so that the transport stream TS is acquired as a multiplexed stream.

In addition, the multiplexer 103 inserts the identification information indicating that the image data included in the base stream includes the image data acquired by the performance of the blending processing, into a layer of the transport stream TS. In this case, the multiplexer 103 inserts a video scalability information descriptor (video scalability information descriptor) to be newly defined, into a video elementary stream loop arranged corresponding to the enhanced stream under a program map table.

FIG. 20(*a*) illustrates an exemplary structure (Syntax) of the video scalability information descriptor. FIG. 20(*b*) illustrates the descriptions (Semantics) of main information in the exemplary structure. The 8-bit field of "video_scalability_information_descriptor_tag" indicates the type of the descriptor, and here indicates the video scalability information descriptor. The 8-bit field of "video_scalability_information_descriptor_length" indicates the length (size) of the descriptor, and indicates the byte length of the subsequent as the length of the descriptor.

The 1-bit field of "temporal_scalable_flag" is flag information indicating whether the stream is temporal scalable. For example, "1" indicates that being temporal scalable, and "0" indicates that not being temporal scalable. The 1-bit field of "picture_blending_for_base_stream_flag" is flag information indicating whether the picture blending processing has been performed to the base stream. For example, "1" indicates that the blending processing has been performed, and "0" indicates that no blending processing has been performed.

When the "picture_blending_for_base_stream_flag" is "1", the 4-bit field of "blend_coef_alpha", the 4-bit field of "blend_coef_beta", and furthermore the 1-bit field of "picture_phase" are present. The field of the "blend_coef_alpha" indicates the coefficient α. The field of the "blend_coef_beta" indicates the coefficient β. The field of the "picture_phase" indicates the phase of the picture.

Figure 21:
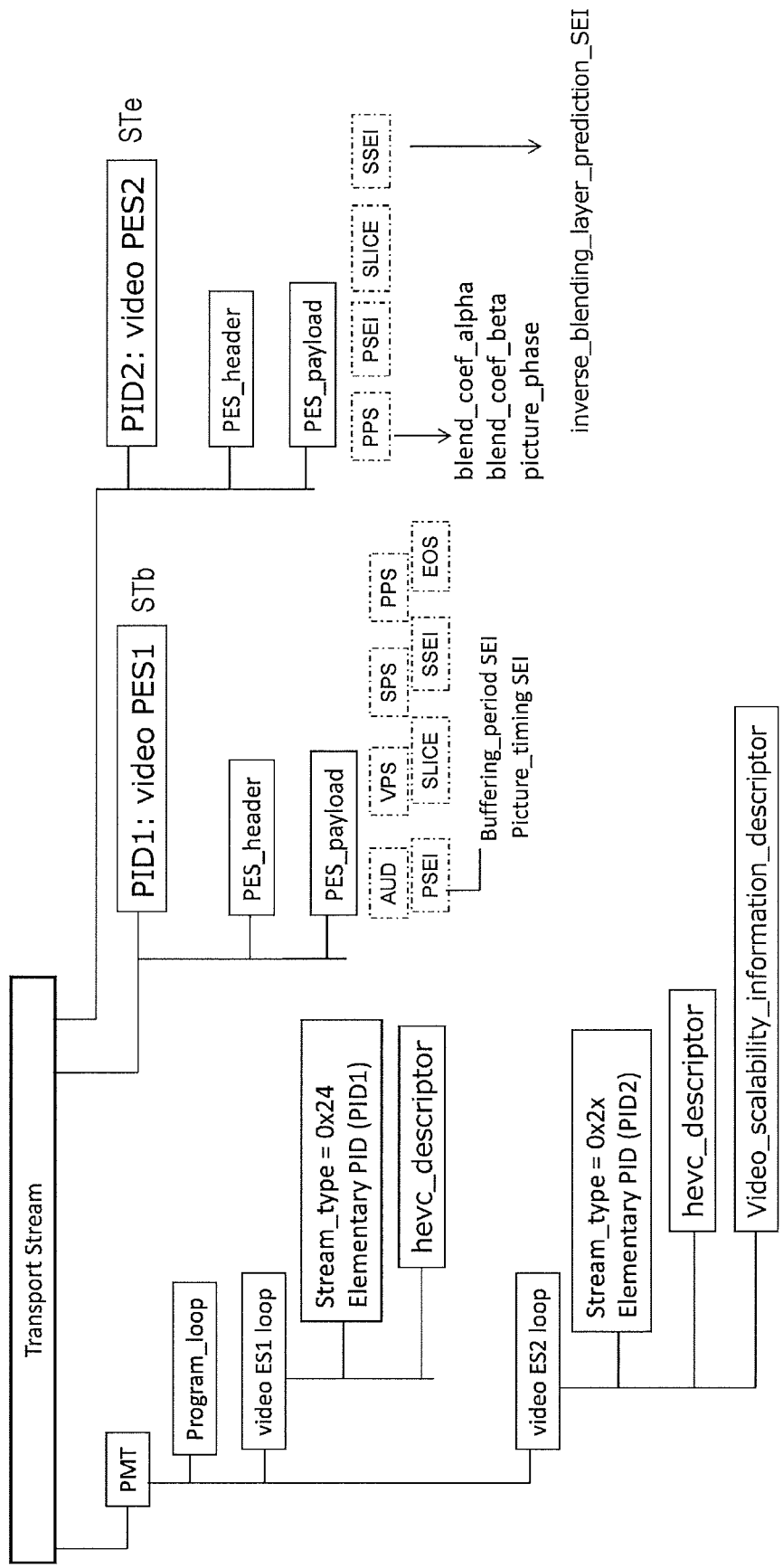
FIG. 21 is a diagram of an exemplary configuration of a transport stream TS.

FIG. 21 illustrates an exemplary configuration of the transport stream TS. The transport stream TS includes two video streams being the base stream STb and the enhanced stream STe. That is, in the exemplary configuration, a PES packet "video PES1" of the base stream STb is present and additionally a PES packet "video PES2" of the enhanced stream STe is present.

The inverse blending layer prediction SEI (refer to FIG. 18(a)) is inserted into the encoded image data of each picture to be contained with the PES packet "video PES2". Note that the blending ratio information and the phase information may be inserted into the extended portion of the PPS, instead of the insertion of the inverse blending layer prediction SEI.

In addition, the transport stream TS includes the program map table (PMT) as one piece of program specific information (PSI). The PSI is information describing to which program each elementary stream included in the transport stream belongs.

The PMT includes a program loop (Program loop) describing information relating to the entire programs, present. In addition, the PMT includes an elementary stream loop having information relating to each video stream, present. The exemplary configuration includes a video elementary stream loop "video ES1 loop" corresponding to the base stream, present and additionally includes a video elementary stream loop "video ES2 loop" corresponding to the enhanced stream, present.

The "video ES1 loop" includes information, such as a stream type and a packet identifier (PID), arranged corresponding to the base stream (video PES1) and additionally includes a descriptor describing information relating to the video stream, arranged. The stream type is set to "0x24" indicating the base stream.

In addition, the "video ES2 loop" includes information, such as a stream type and a packet identifier (PID), arranged corresponding to the enhanced stream (video PES2) and additionally includes a descriptor describing information relating to the video stream, arranged. The stream type is set to "0x2x" indicating the enhanced stream. In addition, the video scalability information descriptor (refer to FIG. 19(a)) is inserted as one descriptor.

Referring back to FIG. 4, the transmission unit 104 modulates the transport stream TS by a modulation scheme appropriate to broadcasting, such as QPSK/OFDM, so as to transmit an RF modulated signal from a transmission antenna.

The operation of the transmission device 100 illustrated in FIG. 4 will be simply described. The 120 fps of image data P is input into the preprocessor 101. Then, the preprocessor 101 outputs the base frame rate of image data Qb and the high frame rate of image data Qe.

Here, the preprocessor 101 performs the blending processing in the units of temporally successive two pictures in the 120 fps of image data P, so as to acquire the base frame rate of image data Qb. In addition, the preprocessor 101 outputs the 120 fps of image data P remaining intact, as the high frame rate of image data Qe.

The image data Qb and the image data Qe acquired by the preprocessor 101 are supplied to the encoder 102. The encoder 102 performs the encoding processing to the image data Qb and the image data Qe, so as to generate the base stream STb and the enhanced stream STe, respectively. In this case, the prediction encoding processing for the base frame rate of image data is performed to the base frame rate of image data Qb so that the base stream STb is acquired. In addition, the prediction encoding processing with the base frame rate of image data Qb or the prediction encoding processing for the high frame rate of image data is adaptably performed to the high frame rate of image data Qe so that the enhanced stream STe is acquired. In the prediction encoding processing with the base frame rate of image data Qb, the after-blend-compensation image data is used in order to reduce the predicted residual.

In addition, the encoder 102 inserts the blending ratio information in the blending processing, into the layer of the enhanced stream, and further inserts, into each access unit of the enhanced stream, the phase information indicating to which of the temporally successive two pictures the access unit corresponds. Specifically, the inverse blending layer prediction SEI (refer to FIG. 18(a)) is inserted into the portion of the "SEIs" of each unit of the enhanced stream or the blending ratio information and the phase information are inserted into the extended portion of the PPS of each access unit of the enhanced stream (refer to FIG. 19(a)).

The base stream STb and the enhanced stream STe generated by the encoder 102 are supplied to the multiplexer 103. The multiplexer 103 performs the PES packetization and further performs the transport packetization to the base stream STb and the enhanced stream STe, so as to perform the multiplexing, so that the transport stream TS is acquired as the multiplexed stream.

In addition, the multiplexer 103 inserts the identification information indicating that the image data included in the base stream STb includes the image data acquired by the performance of the blending processing, into the layer of the transport stream TS. Specifically, the video scalability information descriptor (refer to FIG. 20(a)) is inserted into the video elementary stream loop arranged corresponding to the enhanced stream STe under the program map table.

The transport stream TS generated by the multiplexer 103 is sent to the transmission unit 104. The transmission unit 104 modulates the transport stream TS by the modulation scheme appropriate to the broadcasting, such as the QPSK/OFDM, so as to transmit the RF modulated signal from the transmission antenna.

[Configuration of Reception Device]

Figure 22:
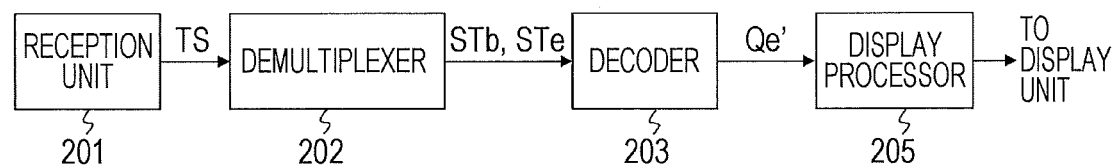
FIG. 22 is a block diagram of an exemplary configuration of a reception device (supporting a high frame rate).

FIG. 22 illustrates an exemplary configuration of the reception device 200A having the decode capability processable to the 120 fps of moving image data. The reception device 200A includes a reception unit 201, a demultiplexer 202, the decoder 203, and a display processor 205.

The reception unit 201 demodulates the RF modulated signal received by a reception antenna, so as to acquire the transport stream TS. The demultiplexer 202 extracts, by filtering of the PIDs, the base stream STb and the enhanced stream STe from the transport stream TS, so as to supply the base stream STb and the enhanced stream STe to the decoder 203.

In addition, the demultiplexer 202 extracts section information included in the layer of the transport stream TS, so as to send the section information to a control unit not illustrated. In this case, the video scalability information descriptor (refer to FIG. 20(a)) is also extracted. With this arrangement, the control unit recognizes, for example, that the image data included in the base stream STb includes the image data acquired by the performance of the blending processing. The decoder 203 performs the decoding processing to the base stream STb and the enhanced stream STe, so as to acquire the high frame rate of image data Qe'.

In addition, the decoder 203 extracts, for example, a parameter set and SEI inserted into each access unit included in the base stream STb or the enhanced stream STe, so as to send the parameter set and the SEI to the control unit not illustrated. In this case, the inverse blending layer prediction SEI (refer to FIG. 18(a)) having the blending ratio information and the phase information or the PPS having the blending information and the phase information in the extended portion is also extracted. With this arrangement, the control unit recognizes the coefficients α and β in the blending processing and to which of the temporally successive two pictures each access unit corresponds. The blending ratio information and the phase information are used in performing the blend compensation to the base frame rate of image data in the decoding processing.

Figure 23:
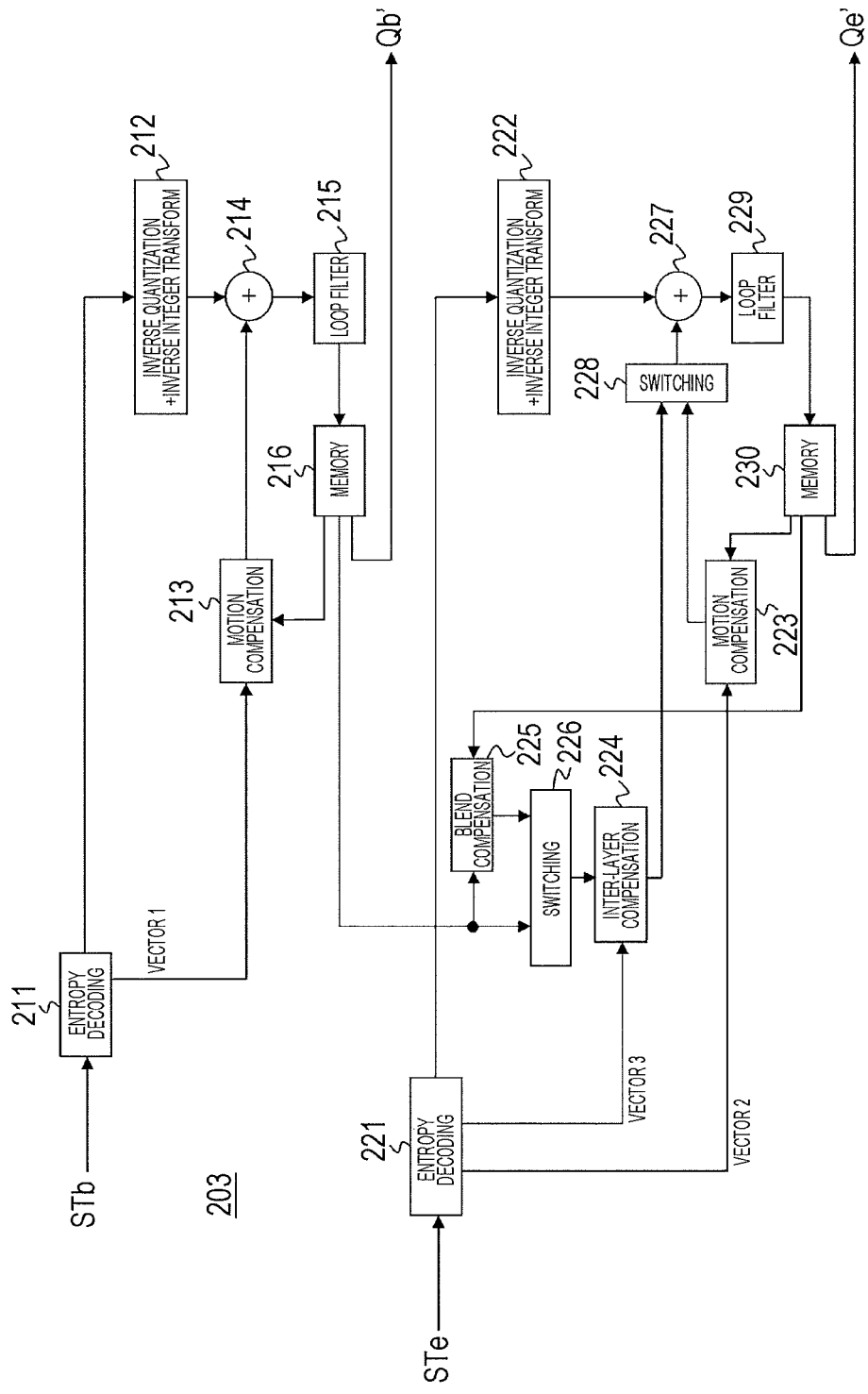
FIG. 23 is a block diagram of an exemplary configuration of a decoding processing part of a decoder (a base layer and one enhanced layer).

FIG. 23 illustrates an exemplary configuration of a decoding processing part of the decoder 203. The exemplary configuration corresponds to the exemplary layer configuration including the base layer (Base Layer) and the one enhanced layer (Ext 1 Layer) (refer to FIG. 8(a)).

The decoder 203 includes an entropy decoding circuit 211, an inverse quantization/inverse integer transform circuit 212, a motion compensation circuit 213, an adding circuit 214, a loop filter 215, and a memory 216. In addition, the decoder 203 includes an entropy decoding circuit 221, an inverse quantization/inverse integer transform circuit 222, a motion compensation circuit 223, an inter-layer compensation circuit 224, a blend compensation circuit 225, a switching circuit 226, an adding circuit 227, a switching circuit 228, a loop filter 229, and a memory 230.

The entropy decoding circuit 211 performs entropy decoding to the base stream STb, so as to acquire the quantized data per block in the base layer. The quantized data is supplied to the inverse quantization/inverse integer transform circuit 212. The inverse quantization/inverse integer transform circuit 212 performs inverse quantization and further performs inverse integer transform to the quantized data, so as to acquire the predicted residual. The predicted residual per block is supplied to the adding circuit 214.

The motion compensation circuit 213 acquires a compensated reference block to which motion compensation has been performed on the basis of the reference picture image data stored in the memory 216. Here, the motion compensation is performed with the motion vector included as the MB header information. The adding circuit 214 adds the compensated reference block to the predicted residual, so as to acquire a block included in the base frame rate of image data Qb'.

The loop filter 125 removes quantization noise from the block acquired by the adding circuit 214 in this manner, and then the block is accumulated in the memory 216. Then, reading the accumulated data from the memory 216, can acquire the base frame rate of image data Qb'.

The entropy decoding circuit 221 performs entropy decoding to the enhanced stream STe, so as to acquire the quantized data per block in the enhanced layer. The quantized data is supplied to the inverse quantization/inverse integer transform circuit 222. The inverse quantization/inverse integer transform circuit 222 performs inverse quantization and further performs inverse integer transform to the quantized data, so as to acquire the predicted residual. The predicted residual per block is supplied to the adding circuit 227.

The motion compensation circuit 223 acquires a compensated reference block for in-layer compensation, to which motion compensation has been performed on the basis of the reference picture image data stored in the memory 230. Here, the motion compensation is performed with the motion vector included as the MB header information.

The switching circuit 226 selectively supplies, as the reference picture image data, the after-blend-compensation image data acquired by the blend compensation circuit 225 or the image data stored in the memory 216, to the inter-layer compensation circuit 224. The inter-layer compensation circuit 224 acquires a compensated reference block for inter-layer compensation, performed with motion compensation and further multiplied by a predicted coefficient for reducing the predicted residual, on the basis of the reference picture image data. Here, the motion compensation is performed with the motion vector included as the MB header information, and the image data switching is also performed on the basis of switching information included as the MB header information.

The reference picture image data (the base frame rate of image data) is supplied from memory 216 to the blend compensation circuit 225. In addition, the predicted-source picture image data (the high frame rate of image data) is supplied from the memory 230 to the blend compensation circuit 225. Note that the picture processing of the base layer and the picture processing of the enhanced layer are synchronously performed.

The blend compensation circuit 225 performs, with the high frame rate of image data, the processing inverse to the blending processing, to the base frame rate of image data, so as to acquire image data as the after-blend-compensation image data, the image data including, when the high frame rate of image data includes the image data of one-side pictures in the units of temporally successive two pictures, the image data of the other-side pictures. The blend processing circuit 225 has a configuration similar to that of the blend compensation circuit 135 in the encoder 102 in the transmission device 100 described above (refer to FIG. 10), and the blending ratio information and the phase information recognized by the control unit as described above, are used in the processing of the blend compensation circuit 135.

The switching circuit 228 selects the compensated reference blocks for the in-layer compensation, acquired by the motion compensation circuit 223 or the compensated reference blocks for the inter-layer compensation, acquired by the inter-layer compensation circuit 224, in units of blocks, so as to perform supplying to the adding circuit 227. Here, the switching is performed in accordance with the MB header information.

The adding circuit 227 adds the compensated reference block to the predicted residual, so as to acquire a block included in the high frame rate of enhanced frame image data Qe'. The loop filter 229 removes quantization noise from the block acquired by the adding circuit 227 in this manner, and then the block is accumulated in the memory 230. Then, reading the accumulated data from the memory 230, acquires the high frame rate of enhanced frame image data Qe'.

Figure 24:
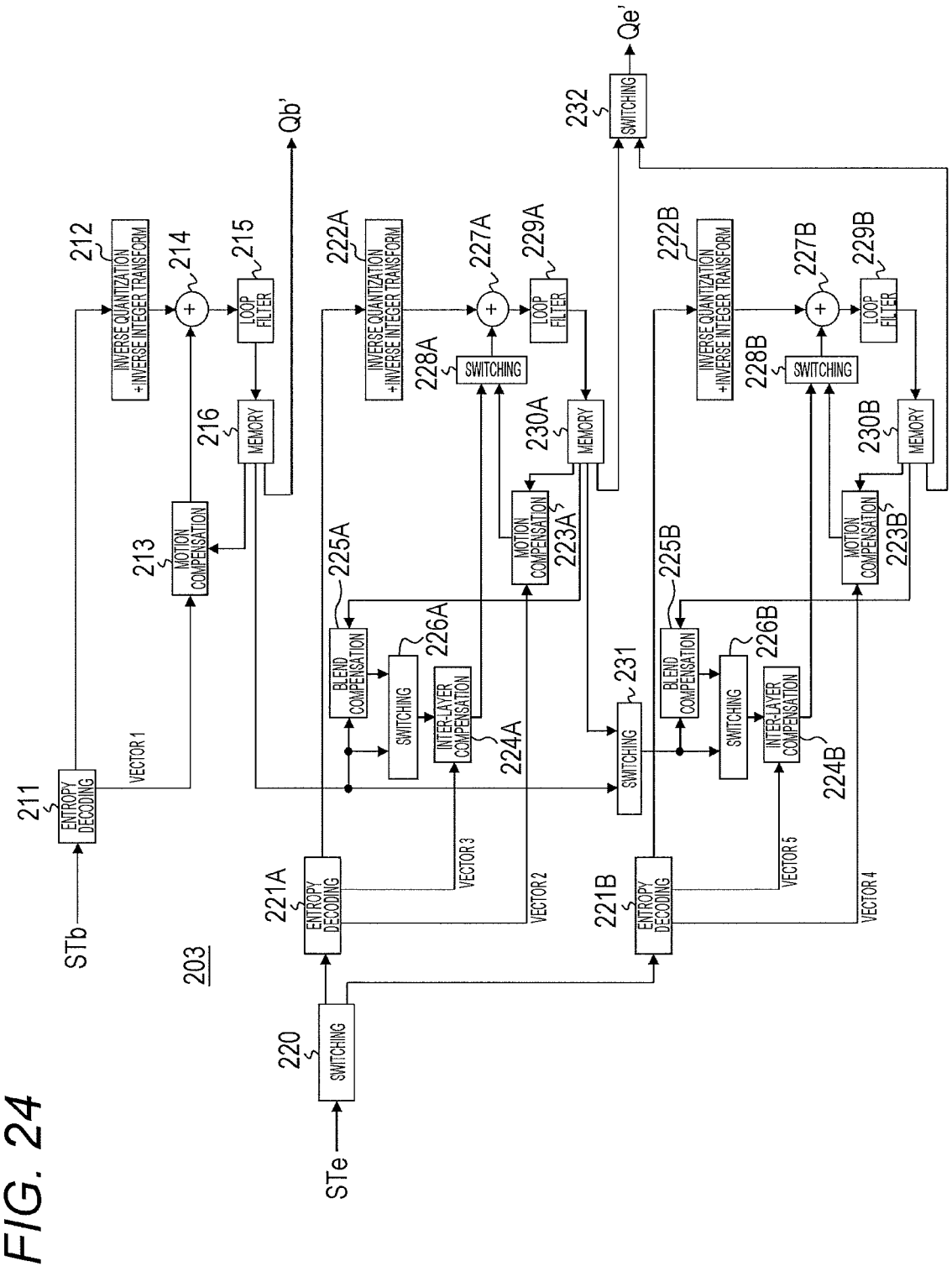
FIG. 24 is a block diagram of an exemplary configuration of the decoding processing part of the decoder (the base layer and two enhanced layers).

FIG. 24 also illustrates an exemplary configuration of the decoding processing part of the decoder 203. The exemplary configuration corresponds to the exemplary layer configuration including the base layer (Base Layer) and the two enhanced layers (Ext 1 Layer and Ext 2 Layer) (refer to FIGS. 8(b) and 8(c)). In FIG. 24, parts corresponding to those of FIG. 23 are denoted with the same reference signs, and thus the detailed descriptions thereof will be appropriately omitted.

The decoder 203 includes an entropy decoding circuit 211, an inverse quantization/inverse integer transform circuit 212, a motion compensation circuit 213, an adding circuit 214, a loop filter 215, and a memory 216. In addition, the decoder 203 includes a switching circuit 220, an entropy decoding circuit 221A, an inverse quantization/inverse integer transform circuit 222A, a motion compensation circuit 223A, an inter-layer compensation circuit 224A, a blend compensation circuit 225A, a switching circuit 226A, an adding circuit 227A, a switching circuit 228A, a loop filter 229A, and a memory 230A.

In addition, the decoder 203 includes switching circuit 231, an entropy decoding circuit 221B, an inverse quantization/inverse integer transform circuit 222B, a motion compensation circuit 223B, an inter-layer compensation circuit 224B, a blend compensation circuit 225B, a switching circuit 226B, an adding circuit 227B, an switching circuit 228B, a loop filter 229B, a memory 230B, and switching circuits 231 and 232.

Decoding processing to the base stream STb, namely, the decoding processing of the base layer (Base Layer) is similar to that in the exemplary configuration of the decoding processing part of the decoder 203 of FIG. 23, and thus the detailed description thereof will be omitted. Encoding processing to the enhanced stream STe is performed being divided into decoding processing of the enhanced layer 1 and decoding processing of the enhanced layer 2.

The switching circuit 220 divides the enhanced stream STe to the access units of the pictures to be handled in the decoding processing of the enhanced layer 1 (encoded image data) and the access units of the pictures to be handled in the decoding processing of the enhanced layer 2 (encoded image data). Here, the access units of the pictures to be handled in the decoding processing of the enhanced layer 1 are each the access unit of the picture at the odd position in the temporally successive two pictures. In addition, the access units of the pictures to be handled in the decoding processing of the enhanced layer 2 are each the access unit of the picture at the even position in the temporally successive two pictures.

In FIG. 24, a system for the decoding processing of the enhanced layer 1 includes the respective circuits indicated with the reference signs denoted with "A". The system for the decoding processing of the enhanced layer 1 has a configuration similar to that of a system for the decoding processing of the enhanced layer in the exemplary configuration of the decoding processing part of the decoder 203 of FIG. 23, and reading accumulated data from the memory 230A, sequentially acquires the image data of the picture at the odd position in each temporally successive two pictures in the image data of the pictures in the high frame rate. Note that the system for the decoding processing of the enhanced layer 1 performs compensation processing with the base layer or compensation processing in the enhanced layer 1.

In FIG. 24, a system for the decoding processing of the enhanced layer 2 includes the respective circuits indicated with the reference signs denoted with "B". The system for the decoding processing of the enhanced layer 2 has a configuration similar to that of the system for the decoding processing of the enhanced layer in the exemplary configuration of the decoding processing part of the decoder 203 of FIG. 23, and reading accumulated data from the memory 230B, sequentially acquires the image data of the picture at the even position in each temporally successive two pictures in the image data of the pictures in the high frame rate.

Note that the system for the decoding processing of the enhanced layer 2 performs compensation processing with the base layer, prediction encoding processing with the enhanced layer 1, or compensation processing in the enhanced layer 2. In a case where the compensation processing with the base layer is performed, the switching circuit 231 selects the output of the memory 216. Meanwhile, in a case where the compensation processing with the enhanced layer 1 is performed, the switching circuit 231 selects the output of the memory 230A.

Thus, acquisition is sequentially made.

The switching circuit 232 combines the image data of the pictures at the odd positions read from the memory 230A and the image data of the pictures at the even positions read from the memory 230B, so that the high frame rate of image data Qe is acquired.

Referring back to FIG. 22, the display processor 205 performs, as necessary, interpolation processing in time, namely, frame interpolation processing to the high frame rate of image data Qe' and acquires a frame rate of image data, the frame rate being higher than 120 fps, so as to supply the frame rate of image data to a display unit.

The operation of the reception device 200A illustrated in FIG. 22, will be simply described. The reception unit 201 demodulates the RF modulated signal received by the reception antenna, so as to acquire the transport stream TS. The transport stream TS is sent to the demultiplexer 202. The demultiplexer 202 extracts, by the filtering of the PIDs, the base stream STb and the enhanced stream STe from the transport stream TS, so as to supply the base stream STb and the enhanced stream STe to the decoder 203.

In addition, the demultiplexer 202 extracts the section information included in the layer of the transport stream TS, so as to send the section information to the control unit not illustrated. The video scalability information descriptor (refer to FIG. 20(a)) is also extracted. With this arrangement, the control unit recognizes, for example, that the image data included in the base stream STb includes the image data acquired by the performance of the blending processing.

The decoder 203 performs the decoding processing to the base stream STb and the enhanced stream STe, so as to acquire the high frame rate of image data Qe'. In addition, the decoder 203 extracts, for example, the parameter set and the SEI inserted into each access unit included in the base stream STb or the enhanced stream STe, so as to send the parameter set and the SEI to the control unit not illustrated. With this arrangement, the control unit recognizes the coefficients $\alpha$ and $\beta$ in the blending processing and to which of the temporally successive two pictures each access unit corresponds. The blending ratio information and the phase information are used in performing the blend compensation to the base frame rate of image data in the decoding processing.

The high frame rate of image data Qe' acquired by the decoder 203 is supplied to the display processor 205. As necessary, the interpolation processing in time, namely, the frame interpolation processing is performed to the high frame rate of image data Qe' so that the frame rate of image data is acquired, the frame rate being higher than 120 fps. The image data is supplied to the display unit so that image display is performed.

Figure 25:
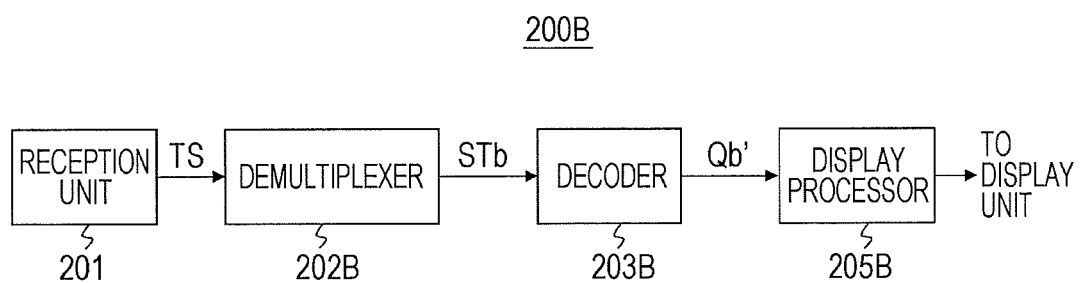
FIG. 25 is a block diagram of an exemplary configuration of a reception device (supporting a normal frame rate).

FIG. 25 illustrates an exemplary configuration of the reception device 200B having the decode capability processable to the 60 fps of moving image data. In FIG. 25, parts corresponding to those of FIG. 22 are denoted with the same reference signs, and thus the detailed descriptions thereof will be appropriately omitted. The reception device 200B includes a reception unit 201, a demultiplexer 202B, a decoder 203B, and a display processor 205B.

The reception unit 201 demodulates the RF modulated signal received by a reception antenna, so as to acquire the transport stream TS. The demultiplexer 202B extracts, by filtering of the PIDs, only the base stream STb from the transport stream TS, so as to supply the base stream STb to the decoder 203B.

The decoder 203B performs the decoding processing to the base stream STb, so as to acquire the base frame rate of image data Qb. The display processor 205B performs interpolation processing in time, namely, frame interpolation processing to the 60 fps of image data Qb so that a frame rate of image data is acquired, the frame rate being higher than 60 fps. The image data is supplied to the display unit so that image display is performed.

As described above, the transmission and reception system 10 illustrated in FIG. 1 acquires the base frame rate of image data Qb, the base frame rate being 60 fps, by the performance of the blending processing in the units of temporally successive two pictures in the 120 fps of image data P, and then transmits the base stream STb acquired by the performance of the prediction encoding processing to the base frame rate of image data Qb. Therefore, for example, in a case where the decode capability processable to the base frame rate of image data is provided on the reception side, acquiring the base frame rate of image data by the processing of the base stream STb can display smooth images as a moving image, and additionally the frame interpolation processing by low load computing in display processing can avoid causing a problem in image quality.

In addition, the transmission and reception system 10 illustrated in FIG. 1 transmits the enhanced stream STe including the high frame rate of image data Qe. Therefore, a receiver having a decode capability processable to the high frame rate of image data, processes the enhanced stream STe and acquires the high frame rate of image data so that the image display in the high frame rate can be favorably performed.

In addition, in a case where performing the prediction encoding to the high frame rate of image data Qe with reference to the base frame rate of image data Qb, the transmission and reception system 10 illustrated in FIG. 1 performs the blend compensation processing to the base frame rate of image data Qb and uses the after-blend-compensation image data as the reference image data. Therefore, the predicted residual can be reduced in performing the prediction encoding to the high frame rate of image data Qe.

In addition, the transmission and reception system 10 illustrated in FIG. 1 inserts the blending ratio information in the blending processing, into the layer of the enhanced stream. Therefore, on the reception side, the processing inverse to the blending processing can be easily and appropriately performed with the blending ratio information.

In addition, the transmission and reception system 10 illustrated in FIG. 1 inserts, into each access unit of the enhanced stream, the phase information indicating to which of the temporally successive two pictures the access unit corresponds. Therefore, on the reception side, the coefficients in the processing inverse to the blending processing (the blend compensation processing) can be appropriately switched with the phase information so that the processing can be easily and appropriately performed.

2. Modification

Note that, according to the embodiment described above, the example in which the entire frame rate is 120 fps and the base frame rate is 60 fps, has been given, but the combination of the frame rates is not limited to this. For example, a similar manner is made with a combination of 100 fps and 50 fps.

In addition, according to the embodiment described above, the transmission and reception system 10 including the transmission device 100 and the reception device 200 has been given, but the configuration of the transmission and reception system acquired by the application of the present technology is not limited to this. For example, the part of the reception device 200 may include a set top box and a monitor connected through a digital interface, such as high-definition multimedia interface (HDMI). Note that "HDMI" is a registered trademark.

In addition, according to the embodiment described above, the example in which the container is the transport stream (MPEG-2 TS), has been given. However, the present technology can be similarly applied to a system having a configuration in which distribution is performed to a reception terminal with a network, such as the Internet. In the distribution of the Internet, distribution is performed with containers in MP4 and the other formats. That is, examples of the container include containers in various formats, such as the transport stream (MPEG-2 TS) and MPEG media transport (MMT) adopted in the digital broadcast standards and ISOBMFF (MP4) used in the distribution of the Internet.

In addition, the present technology can have the following configurations.

(1) A transmission device includes:

an image encoding unit configured to acquire a base stream including, as an access unit, encoded image data per picture in a base frame rate of image data acquired by performing blending processing in units of temporally successive two pictures in a high frame rate of image data, the image encoding unit being configured to acquire an enhanced stream including, as an access unit, encoded image data per picture in the high frame rate of image data; and a transmission unit configured to transmit a container in a predetermined format, the container including the base stream and the enhanced stream.

(2) The transmission device described in (1) above further includes:

an information inserting unit configured to insert blending ratio information in the blending processing, into a layer of the enhanced stream.

(3) According to the transmission device described in (2) above, the base stream and the enhanced stream each have a NAL unit structure, and the information inserting unit inserts a SEI NAL unit having the blending ratio information, into the enhanced stream.

(4) According to the transmission device described in (2) above, the base stream and the enhanced stream each have a NAL unit structure, and the information inserting unit inserts the blending ratio information into a PPS NAL unit of the enhanced stream.

(5) The transmission device described in any of (1) to (4) above further includes:

an information inserting unit configured to insert, into each access unit of the enhanced stream, phase information indicating to which of the temporally successive two pictures the access unit corresponds.

(6) The transmission device described in any of (1) to (5) above further includes:

an information inserting unit configured to insert, into a layer of the container, identification information indicating that the image data included in the base stream includes the image data acquired by the performance of the blending processing.

(7) According to the transmission device described in any of (1) to (6) above, the image encoding unit performs prediction encoding processing for the base frame rate of image data, to the base frame rate of image data, so as to acquire the base stream, the image encoding unit being configured to perform, with the high frame rate of image data, processing inverse to the blending processing, to the base frame rate of image data, so as to acquire image data as after-blend-compensation image data, the image data including, when the high frame rate of image data includes image data of one-side pictures in the units of temporally successive two pictures, image data of the other-side pictures, the image encoding unit being configured to perform prediction encoding processing with the after-blend-compensation image data, to the high frame rate of image data, so as to acquire the enhanced stream.

(8) According to the transmission device described in (7) above, the image encoding unit acquires, per predicted block in the high frame rate of image data, image data over a range of more than the predicted block, as the after-blend-compensation image data.

(9) A transmission method includes:

an image encoding step of acquiring a base stream including, as an access unit, encoded image data per picture in a base frame rate of image data acquired by performing blending processing in units of temporally successive two pictures in a high frame rate of image data, and acquiring an enhanced stream including, as an access unit, encoded image data per picture in the high frame rate of image data; and a transmission step of transmitting a container in a predetermined format by a transmission unit, the container including the base stream and the enhanced stream.

(10) A reception device includes:

a reception unit configured to receive a container in a predetermined format, the container including a base stream and an enhanced stream, the base stream being acquired by performing prediction encoding processing for a base frame rate of image data, to the base frame rate of image data acquired by performing blending processing in units of temporally successive two pictures in a high frame rate of image, the enhanced stream being acquired by performing prediction encoding processing with after-blend-compensation image data, to the high frame rate of image data, the after-blend-compensation image data being acquired by performing, with the high frame rate of image data, processing inverse to the blending processing, to the base frame rate of image data, the after-blend-compensation image data including, when the high frame rate of image data includes image data of one-side pictures in the units of temporally successive two pictures, image data of the other-side pictures; and a processing unit configured to process only the base stream so as to acquire the base frame rate of image data or both of the base stream and the enhanced stream so as to acquire the high frame rate of image data, in which, when performing decoding processing to the enhanced stream, the processing unit performs, with the high frame rate of image data acquired by the processing of the enhanced stream, the processing inverse to the blending processing, to the base frame rate of image data acquired by the processing of the base stream, so as to acquire the after-blend-compensation image data including, when the high frame rate of image data includes the image data of the one-side pictures in the units of temporally successive two pictures, the image data of the other-side pictures, the processing unit being configured to use the after-blend-compensation image data as reference image data.

(11) According to the reception device described in (10), a layer of the enhanced stream includes blending ratio information in the blending processing, inserted, and the processing unit uses the blending ratio information in performing the processing inverse to the blending processing.

(12) According to the reception device described in (10) or (11), each access unit in the enhanced stream includes phase information indicating to which of the temporally successive two pictures the access unit corresponds, inserted, and the processing unit uses the phase information in performing the processing inverse to the blending processing.

(13) A reception method includes:

a reception step of receiving a container in a predetermined format by a reception unit, the container including a base stream and an enhanced stream, the base stream being acquired by performing prediction encoding processing for a base frame rate of image data, to the base frame rate of image data acquired by performing blending processing in units of temporally successive two pictures in a high frame rate of image, the enhanced stream being acquired by performing prediction encoding processing with after-blend-compensation image data, to the high frame rate of image data, the after-blend-compensation image data being acquired by performing, with the high frame rate of image data, processing inverse to the blending processing, to the base frame rate of image data, the after-blend-compensation image data including, when the high frame rate of image data includes image data of one-side pictures in the units of temporally successive two pictures, image data of the other-side pictures; and a processing step of processing only the base stream so as to acquire the base frame rate of image data or both of the base stream and the enhanced stream so as to acquire the high frame rate of image data, in which in the processing step, when decoding processing is performed to the enhanced stream, with the high frame rate of image data acquired by the processing of the enhanced stream, the processing inverse to the blending processing is performed to the base frame rate of image data acquired by the processing of the base stream, so as to acquire the after-blend-compensation image data including, when the high frame rate of image data includes the image data of the one-side pictures in the units of temporally successive two pictures, the image data of the other-side pictures, and the after-blend-compensation image data is used as reference image data.

(14) A reception device includes:

a reception unit configured to receive a container in a predetermined format, the container including a base stream and an enhanced stream, the base stream being acquired by performing encoding processing to a base frame rate of image data acquired by performing blending processing in units of temporally successive two pictures in a high frame rate of image data, the enhanced stream being acquired by performing encoding processing to the high frame rate of image data; and a processing unit configured to process only the base stream so as to acquire the base frame rate of image data or both of the base stream and the enhanced stream so as to acquire the high frame rate of image data.

Main features of the present technology are as follows: the blending processing is performed in the units of temporally successive two pictures in the 120 fps of image data P so that the base frame rate of image data Qb is acquired, the base frame rate being 60 fps. The base stream STb including the base frame rate of image data Qb is transmitted together with the enhanced stream STe including the high frame rate of image data Qe, the high frame rate being 120 fps, so that the high frame rate of image data can be favorably transmitted with downward compatibility achieved (refer to FIGS. 3 and 9).

REFERENCE SIGNS LIST

10 Transmission and reception system
100 Transmission device
101 Preprocessor
102 Encoder
103 Multiplexer
104 Transmission unit
111, 114 Delay circuits
112 Computing circuit
113 Latch circuit
121 Blocking circuit
122 Subtracting circuit
123 Motion prediction/motion compensation circuit
124 Integer transform/quantization circuit
125 Inverse quantization/inverse integer transform circuit
126 Adding circuit
127 Loop filter
128 Memory
129 Entropy encoding circuit
130 Switching circuit
131, 131A, 131B Blocking circuits
132, 132A, 132B Subtracting circuits
133, 133A, 133B Motion prediction/motion compensation circuit
134, 134A, 134B Inter-layer prediction/inter-layer compensation circuit
135, 135A, 135B Blend circuit
136, 136A, 136B, 137, 137A, 137B Switching circuit
138, 138A, 138B Integer transform/quantization circuit
139, 139A, 139B Inverse quantization/inverse integer transform circuit
140, 140A, 140B Adding circuit
141, 141A, 141B Loop filter
142, 142A, 142B Memory
143, 143A, 143B Entropy encoding circuit
145, 146 Switching circuit
151, 152 Multiplying unit
153 Adding unit
200A, 200B Reception device
201 Reception unit
202, 202B Demultiplexer
203, 203B Decoder
205, 205B Display processor
211 Entropy decoding circuit
212 Inverse quantization/inverse integer transform circuit
213 Motion compensation circuit
214 Adding circuit
215 Loop filter
216 Memory
220 Switching circuit
221, 221A, 221B Entropy decoding circuit
222, 222A, 222B Inverse quantization/inverse integer transform circuit
223, 223A, 223B Motion compensation circuit
224, 224A, 224B Inter-layer compensation circuit
225, 225A, 225B Blend compensation circuit
226, 226A, 226B Switching circuit
227, 227A, 227B Adding circuit
228, 228A, 228B Switching circuit
229, 229A, 229B Loop filter
230, 230A, 230B Memory
231, 232 Switching circuit

The invention claimed is:

1. A transmission device, comprising circuitry configured to:

blend a first picture and a second picture of an enhanced layer having a high frame rate according to a blending ratio to generate a blended picture of a base layer having a base frame rate according to:

$$C = \alpha A + \beta B,$$

where C, A, and B represent image data of the blended picture, the first picture, and the second picture, respectively, $\alpha$ and $\beta$ are positive coefficients corresponding to the blending ratio, $\alpha+\beta=1$, and each sample value of the image data A is multiplied with the coefficient $\alpha$ and added to a corresponding sample value of the image data B multiplied with the coefficient $\beta$ to generate each respective sample value of the image data C of the blended picture;

encode the blended picture to generate a reconstructed picture of the base layer having the base frame rate;

generate an after-blend-compensation block based on image data B' that corresponds to a portion of the second picture of the enhanced layer having the high frame rate, and image data C' that corresponds to a portion of the reconstructed picture of the base layer having the base frame rate according to:

$$D = C' \cdot 1/\alpha + B' \cdot -\beta/\alpha,$$

where D represents image data of the after-blend-compensation block and each sample value of the image data C' multiplied with the coefficient $1/\alpha$ is added to a corresponding sample value of the image data B' multiplied with the coefficient $-\beta/\alpha$ to generate each respective sample value of the image data D; and encode a prediction block of the second picture of the enhanced layer having the high frame rate using the after-blend-compensation block as a reference.

2. The transmission device according to claim 1, wherein the after-blend-compensation block is in a range including the prediction block of the second picture.

3. The transmission device according to claim 1, wherein the circuitry is further configured to transmit information of the blending ratio.

4. The transmission device according to claim 3, wherein the information of the blending ratio is carried in a supplemental enhancement information (SET) network abstraction layer (NAL) unit of the second picture.

5. The transmission device according to claim 3, wherein the information of the blending ratio is carried in a picture parameter set (PPS) of the second picture.

6. The transmission device according to claim 1, wherein the first picture and the second picture are two temporally successive pictures, and
the circuitry is further configured to insert phase information into an access unit of the second picture to indicate to which of the two temporally successive pictures the access unit corresponds.

7. The transmission device according to claim 1, wherein the circuitry is further configured to transmit identification information indicating that the base layer includes the image data of the blended picture.

8. A transmission method, comprising:
blending, by circuitry, a first picture and a second picture of an enhanced layer having a high frame rate according to a blending ratio to generate a blended picture of a base layer having a base frame rate according to:

$$C = \alpha A + \beta B,$$

where C, A, and B represent image data of the blended picture, the first picture, and the second picture, respectively, α and β are positive coefficients corresponding to the blending ratio, α+β=1, and each sample value of the image data A is multiplied with the coefficient α and added to a corresponding sample value of the image data B multiplied with the coefficient β to generate each respective sample value of the image data C of the blended picture;
encoding, by the circuitry, the blended picture to generate a reconstructed picture of the base layer having the base frame rate;
generating, by the circuitry, an after-blend-compensation block based on image data B' that corresponds to a portion of the second picture of the enhanced layer having the high frame rate, and image data C' that corresponds to a portion of the reconstructed picture of the base layer having the base frame rate according to:

$$D = C' \cdot 1/\alpha + B' \cdot -\beta/\alpha,$$

where D represents image data of the after-blend-compensation block and each sample value of the image data C' multiplied with the coefficient 1/α is added to a corresponding sample value of the image data B' multiplied with the coefficient −β/α to generate each respective sample value of the image data D; and
encoding, by the circuitry, a prediction block of the second picture of the enhanced layer having the high frame rate using the after-blend-compensation block as a reference.

9. The transmission method according to claim 8, wherein the after-blend-compensation block is in a range including the prediction block of the second picture.

10. The transmission method according to claim 8, wherein the first picture and the second picture are two temporally successive pictures, and
the transmission method further comprises:
inserting phase information into an access unit of the second picture to indicate to which of the two temporally successive pictures the access unit corresponds.

11. A reception device, comprising circuitry configured to:
decode a coded blended picture of a base layer having a base frame rate to generate a decoded blended picture, the coded blended picture corresponding to a blended picture that is generated by blending a first picture and a second picture of an enhanced layer having a high frame rate based on a blending ratio according to:

$$C = \alpha A + \beta B,$$

where C, A, and B represent image data of the blended picture, the first picture, and the second picture, respectively, α and β are positive coefficients corresponding to the blending ratio, α+β=1, and each sample value of the image data A is multiplied with the coefficient α and added to a corresponding sample value of the image data B multiplied with the coefficient β to generate each respective sample value of the image data C of the blended picture;
generate an after-blend-compensation block based on image data B' that corresponds to a portion of a reference picture of the enhanced layer having the high frame rate, and image data C' that corresponds to a portion of the decoded blended picture of the base layer having the base frame rate according to:

$$D = C' \cdot 1/\alpha + B' \cdot -\beta/\alpha,$$

where D represents image data of the after-blend-compensation block and each sample value of the image data C' multiplied with the coefficient 1/α is added to a corresponding sample value of the image data B' multiplied with the coefficient −β/α to generate each respective sample value of the image data D; and
reconstruct a prediction block of the second picture of the enhanced layer having the high frame rate using the after-blend-compensation block as a reference.

12. The reception device according to claim 11, wherein the after-blend-compensation block is in a range including the prediction block of the second picture.

13. The reception device according to claim 11, wherein the circuitry is further configured to receive information of the blending ratio.

14. The reception device according to claim 13, wherein the circuitry is further configured to receive the information of the blending ratio from a supplemental enhancement information (SEI) network abstraction layer (NAL) unit of the second picture.

15. The reception device according to claim 13, wherein the circuitry is further configured to receive the information of the blending ratio from a picture parameter set (PPS) of the second picture.

16. The reception device according to claim 11, wherein the first picture and the second picture are two temporally successive pictures, and
the circuitry is further configured to receive phase information from an access unit of the second picture that indicates to which of the two temporally successive pictures the access unit corresponds.

17. The reception device according to claim 11, wherein the circuitry is further configured to receive identification information indicating that the base layer includes the image data of the blended picture.

18. A reception method, comprising:
decoding, by a circuitry, a coded blended picture of a base layer having a base frame rate to generate a decoded blended picture, the coded blended picture corresponding to a blended picture that is generated by blending a first picture and a second picture of an enhanced layer having a high frame rate based on a blending ratio according to:

$$C = \alpha A + \beta B,$$

where C, A, and B represent image data of the blended picture, the first picture, and the second picture, respectively, α and β are positive coefficients corresponding to the blending ratio, α+β=1, and each sample value of the image data A is multiplied with the coefficient α and added to a corresponding sample value of the image data B multiplied with the coefficient β to generate each respective sample value of the image data C of the blended picture;

generating, by the circuitry, an after-blend-compensation block based on image data B' that corresponds to a portion of a reference picture of the enhanced layer having the high frame rate, and image data C' that corresponds to a portion of the decoded blended picture of the base layer having the base frame rate according to:

$$D = C' \cdot 1/\alpha + B' \cdot -\beta/\alpha,$$

where D represents image data of the after-blend-compensation block and each sample value of the image data C' multiplied with the coefficient $1/\alpha$ is added to each respective sample value of the image data B' multiplied with the coefficient $-\beta/\alpha$ to generate each respective sample value of the image data D; and reconstructing, by the circuitry, a prediction block of the second picture of the enhanced layer having the high frame rate using the after-blend-compensation block as a reference.

19. The reception method according to claim 18, wherein the after-blend-compensation block is in a range including the prediction block of the second picture.

20. The reception method according to claim 18, wherein the first picture and the second picture are two temporally successive pictures, and the reception method further comprises:

receiving phase information from an access unit of the second picture that indicates to which of the two temporally successive pictures the access unit corresponds.

* * * * *